(12) United States Patent
Ozeki et al.

(10) Patent No.: US 8,345,211 B2
(45) Date of Patent: Jan. 1, 2013

(54) DISPLAY APPARATUS AND MANUFACTURING METHOD THEREFOR, AND ACTIVE MATRIX SUBSTRATE

(75) Inventors: Tadatoshi Ozeki, Osaka (JP); Takaharu Yamada, Osaka (JP); Masahiro Yoshida, Osaka (JP); Kazuyori Mitsumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 249 days.

(21) Appl. No.: 13/000,061

(22) PCT Filed: Jul. 3, 2009

(86) PCT No.: PCT/JP2009/003094
§ 371 (c)(1),
(2), (4) Date: Dec. 20, 2010

(87) PCT Pub. No.: WO2010/021075
PCT Pub. Date: Feb. 25, 2010

(65) Prior Publication Data
US 2011/0141071 A1 Jun. 16, 2011

(30) Foreign Application Priority Data
Aug. 20, 2008 (JP) ................................. 2008-211625

(51) Int. Cl.
*G02F 1/1345* (2006.01)
(52) U.S. Cl. ......... 349/152; 349/149; 349/150; 349/151
(58) Field of Classification Search ........... 349/149–152
See application file for complete search history.

(56) References Cited

U.S. PATENT DOCUMENTS

| | | | |
|---|---|---|---|
| 6,525,705 B1 | 2/2003 | Ishii et al. | |
| 6,525,718 B1 * | 2/2003 | Murakami et al. | 345/206 |
| 2007/0035491 A1 | 2/2007 | Chen et al. | |
| 2007/0063951 A1 | 3/2007 | Lin et al. | |
| 2007/0285595 A1 | 12/2007 | Hirao | |
| 2008/0018636 A1 | 1/2008 | Chang | |

FOREIGN PATENT DOCUMENTS

| | | |
|---|---|---|
| JP | 11-160677 A | 6/1999 |
| JP | 2000-105576 A | 4/2000 |
| JP | 2000-321599 A | 11/2000 |

(Continued)

OTHER PUBLICATIONS

English translation and drawings of WO 2008/047495.

(Continued)

*Primary Examiner* — Phu Vu
(74) *Attorney, Agent, or Firm* — Keating & Bennett, LLP

(57) ABSTRACT

A display panel includes a plurality of display lines provided in each of blocks and extending in parallel with each other, a plurality of drive circuits provided outside a display region and connected to the display lines in the respective blocks, a plurality of first lines provided outside the display region and intersecting end portions closer to the drive circuits of the display lines in the respective blocks, the first lines being insulated from the display lines, and a second line provided outside the display region and intersecting end portions farther from the drive circuits of the display lines of all the blocks, the second line being insulated from the display lines. The second line is configured to intersect the first lines while being insulated from the first lines, and be supplied with a display signal from each of the drive circuits via an amplifier circuit.

21 Claims, 7 Drawing Sheets

FOREIGN PATENT DOCUMENTS

| | | |
|---|---|---|
| RU | 2 089 941 C1 | 9/1997 |
| RU | 2 133 516 C1 | 7/1999 |
| RU | 2 165 113 C1 | 4/2001 |
| WO | 2008/047495 A1 | 4/2008 |

OTHER PUBLICATIONS

Official Communication issued in International Patent Application No. PCT/JP2009/003094, mailed on Oct. 6, 2009.

Ozeki et al.; "Display Apparatus and Manufacturing Method Therefor, and Active Matrix Substrate"; U.S. Appl. No. 13/024,389, filed Feb. 10, 2011.

English translation of an Official Communication issued in corresponding Russian Patent Application No. 2010151657, mailed on Sep. 18, 2011.

* cited by examiner

DISPLAY APPARATUS AND MANUFACTURING METHOD THEREFOR, AND ACTIVE MATRIX SUBSTRATE

BACKGROUND

The present disclosure relates to display apparatuses and methods for manufacturing the display apparatuses, and active matrix substrates. More particularly, the present disclosure relates to techniques of repairing a break in a line for display provided in an active matrix substrate and a display apparatus.

A liquid crystal display apparatus includes, for example, an active matrix substrate and a counter substrate facing each other. The active matrix substrate includes, for example, lines for display (hereinafter referred to as display lines) including a plurality of gate lines extending in parallel with each other and a plurality of source lines extending in parallel with each other and in a direction perpendicular to the gate lines. Therefore, the liquid crystal display apparatus including the active matrix substrate has the following problem. If a break occurs in a display line, such as a gate line or a source line, a display signal is not supplied from a drive circuit to a portion farther than the break of the broken display line, resulting in a significant degradation in display quality.

In order to solve the above problem, a variety of liquid crystal display apparatuses have been proposed which include lines for repairing a broken line and amplifier circuits connected to the broken-line repairing lines, which are provided outside a display region for displaying an image (see, for example, Japanese Patent Publication Nos. 2000-321599, H11-160677, 2000-105576, and 2008-58337).

SUMMARY

FIG. 11 is a plan view of a conventional liquid crystal display apparatus 150 corresponding to the plan view described in Japanese Patent Publication No. 2000-321599 (FIG. 5), schematically showing a liquid crystal display element and drive circuit substrates provided around the element.

As shown in FIG. 11, the liquid crystal display apparatus 150 includes a liquid crystal display panel 140, three film substrates 141 attached to an upper end of the liquid crystal display panel 140, and a printed substrate 145 attached to upper ends of the film substrates 141.

As shown in FIG. 11, the liquid crystal display panel 140 includes, in a display region D, a plurality of source lines 103 extending in parallel with each other and a plurality of gate lines (not shown) extending in parallel with each other and in a direction perpendicular to the source lines 103. Here, as shown in FIG. 11, the source lines 103 are divided into blocks B1-B3 which are adjacent to each other and each include a plurality of the source lines 103. The source lines 103 in the respective blocks B1-B3 are each connected to a drive circuit (not shown) provided on the corresponding film substrate 141.

As shown in FIG. 11, the liquid crystal display panel 140 includes, outside the display region D, three on-panel first lines 101c extending along an upper side of the display region D and intersecting upper end portions of the source lines 103 provided in the respective blocks B1-B3, and an L-shaped on-panel second line 101d extending along a left side and a bottom side of the display region D and intersecting lower end portions of the source lines 103.

As shown in FIG. 11, the printed substrate 145 includes three on-printed-substrate first lines 146 connected to the on-panel first lines 101c via on-film-substrate first lines 142 provided on the film substrates 141, respectively, an on-printed-substrate second line 147 intersecting upper end portions of the on-printed-substrate first lines 146 and connected to the on-panel second line 101d via an on-film-substrate second line 143 provided on the leftmost film substrate 141, and an amplifier circuit A provided in a left end portion of the on-printed-substrate second line 147.

It is assumed that, as shown in FIG. 11, in the liquid crystal display apparatus 150 thus configured, when a source line 103 in the block B2 is broken at a portion X. In this case, an intersection M1 of an upper portion of the broken source line 103 and the on-panel first line 101c of the block B2, an intersection M2 of a lower portion of the broken source line 103 and the on-panel second line 101d, and an intersection M3 of the on-printed-substrate first line 146 of the block B2 and the on-printed-substrate second line 147 are irradiated with laser light. As a result, conduction is established between the upper portion of the broken source line 103 and the on-panel first line 101c of the block B2, between the lower portion of the broken source line 103 and the on-panel second line 101d, and between the on-printed-substrate first line 146 of the block B2 and the on-printed-substrate second line 147. As a result, as shown in FIG. 11, a display signal (source signal) is supplied from the drive circuit (not shown) provided on the film substrate 141 to a portion lower than the portion X of the source line 103 via the on-panel first line 101c of the block B2, the on-film-substrate first line 142 of the block B2, the on-printed-substrate first line 146 of the block B2, the on-printed-substrate second line 147, the amplifier circuit A, the on-film-substrate second line 143, and the on-panel second line 101d. Therefore, the source signal is supplied from the drive circuit to a portion farther than the break portion (the portion X) of the source line 103, whereby the break in the source line 103 can be repaired.

As described above, the broken source line 103 is repaired in the liquid crystal display apparatus 150 by, for example, irradiating the intersections M1-M3 with laser light to establish conduction between each line. In this case, however, the intersections M1-M3 are provided on both the liquid crystal display panel 140 and the printed substrate 145, and therefore, a plurality of laser irradiation devices are required and conditions for irradiation with laser light are complicated, leading to an increase in manufacturing cost. Therefore, there is a room for improvement.

The present disclosure has been made in view of the above problem. The detailed description describes implementations of a technique of easily repairing a break in a display line.

According to the present disclosure, first lines inserting end portions closer to drive circuits of display lines in respective blocks and insulated from the display lines, intersect a second line inserting end portions farther than the drive circuits of the display lines in all the blocks on a display panel and insulated from the display lines, where the first lines are insulated from the second line.

Specifically, an example display apparatus of the present disclosure includes a display panel having a display region including a plurality of blocks extending in parallel with each other. The display panel includes a plurality of display lines provided in each of the blocks and extending in parallel with each other and in a direction in which the blocks extend, a plurality of drive circuits each provided outside the display region for a corresponding one of the blocks and connected to the display lines in the corresponding block, a plurality of first lines each provided outside the display region for a corresponding one of the blocks and intersecting end portions closer to the corresponding drive circuit of the display lines in the corresponding block, the first lines being insulated from the display lines, and a second line provided outside the display region and intersecting end portions farther from the drive circuits of the display lines of all the blocks, the second line being insulated from the display lines. The second line is configured to intersect the first lines while being insulated from the first lines, and be supplied with a display signal from each of the drive circuits via an amplifier circuit.

In the above configuration, outside the display region including the blocks extending in parallel with each other, the first lines inserting the end portions closer to the drive circuits of the display lines extending in parallel with each other in the respective blocks, the first lines being insulated from the display lines, intersect the second line inserting the end portions farther than the drive circuits of the display lines in all the blocks, the second line being insulated from the display lines, where the first lines are insulated from the second line. Therefore, intersections of the first lines and the display lines in the respective blocks, intersections of the second line and the display lines in all the blocks, and intersections of the first lines and the second line are provided outside the display region of the display panel. Therefore, a broken display line can be repaired as follows. Specifically, if any one of all the display lines provided on the display panel is broken, an intersection of a portion closer to the driver circuit of the broken display line and the corresponding first line, an intersection of a portion farther from the driver circuit of the broken display line and the second line, and an intersection of the corresponding first line and the second line, i.e., only three portions of the display panel, are irradiated with laser light to establish conduction between each line. In addition, the second line is configured to be supplied with a display signal from each drive circuit via an amplifier circuit. Therefore, by establishing conduction between each line in the above-described manner, a display signal from a drive circuit is amplified by an amplifier circuit and then supplied to a portion farther than a break portion of a broken display line. As a result, when a broken display line is repaired, the display panel is the only target to be irradiated with laser light, and therefore, conditions for irradiation with the laser light are simplified, whereby the broken display line can be easily repaired.

For example, Japanese Patent Publication No. 2000-321599 (FIG. 1) describes a technique of irradiating two points on a display panel with laser light to establish conduction between each line. In this case, a single line corresponding to the first line is provided for all blocks. Loads occur at capacitances at intersections of the line corresponding to the first line and a plurality of signal lines in all the blocks, likely leading to an increase in signal delay. In contrast to this, in the above configuration, the first line is provided for each block, and therefore, the signal delay can be reduced or prevented.

The amplifier circuit may be provided in a portion of each of the first lines between an intersection of the first line and the second line and intersections of the first line and the corresponding display lines.

According to the above configuration, the amplifier circuit is provided for each first line, i.e., for each block, and therefore, a difference between signal delays depending on the position of a block in which a break occurs can be reduced or prevented.

Another example display apparatus of the present disclosure includes a display panel having a display region including a plurality of blocks extending in parallel with each other. The display panel includes a plurality of display lines provided in each of the blocks and extending in parallel with each other and in a direction in which the blocks extend, a plurality of drive circuits each provided outside the display region for a corresponding one of the blocks and connected to the display lines in the corresponding block, a plurality of first lines each provided outside the display region for a corresponding one of the blocks and intersecting end portions closer to the corresponding drive circuit of the display lines in the corresponding block, the first lines being insulated from the display lines, and a second line provided outside the display region and intersecting end portions farther from the drive circuits of the display lines of all the blocks, the second line being insulated from the display lines. The second line is configured to intersect the first lines while being insulated from the first lines, and an amplifier circuit is provided in each of the first lines.

In the above configuration, outside the display region including the blocks extending in parallel with each other, the first lines inserting the end portions closer to the drive circuits of the display lines extending in parallel with each other in the respective blocks, the first lines being insulated from the display lines, intersect the second line inserting the end portions farther than the drive circuits of the display lines in all the blocks, the second line being insulated from the display lines, where the first lines are insulated from the second line. Therefore, intersections of the first lines and the display lines in the respective blocks, intersections of the second line and the display lines in all the blocks, and intersections of the first lines and the second line are provided outside the display region of the display panel. Therefore, a broken display line can be repaired as follows. Specifically, if any one of all the display lines provided on the display panel is broken, an intersection of a portion closer to the driver circuit of the broken display line and the corresponding first line, an intersection of a portion farther from the driver circuit of the broken display line and the second line, and an intersection of the corresponding first line and the second line, i.e., only three portions of the display panel, are irradiated with laser light to establish conduction between each line. In addition, the amplifier circuit is provided in each first line. Therefore, by establishing conduction between each line in the above-described manner, a display signal from a drive circuit is amplified by an amplifier circuit and then supplied to a portion farther than a break portion of a broken display line. As a result, when a broken display line is repaired, the display panel is the only target to be irradiated with laser light, and therefore, conditions for irradiation with the laser light are simplified, whereby the broken display line can be easily repaired.

A portion of each of the first lines between an intersection of the first line and the second line and intersections of the first line and the corresponding display lines may make a detour to temporarily pass through a region farther from the display region.

In the above configuration, a portion of each of the first lines between an intersection of the first line and the second line and intersections of the first line and the corresponding display lines makes a detour. Therefore, in a block in which a broken display line has been repaired, by measuring electrical resistances between the detour portion of the first line, and the display line in which a break has been repaired and the second line, a connection state between the display line in which a break has been repaired and the first line, and a connection state between the first line and the second line can be confirmed.

The display apparatus may include, for each of the blocks, a plurality of first terminals connected to the respective display lines, a second terminal connected to the second line, a third terminal connected to a preceding stage portion closer to the plurality of first terminals of a detour path of the corresponding first line, and a fourth terminal connected to a succeeding stage portion closer to the second terminal of the detour path of the corresponding first line, the first to fourth terminals being provided outside the display region.

In the above configuration, the first terminals connected to the respective display lines, the second terminal connected to the second line, the third terminal connected to the preceding stage portion closer to the first terminals of the detour path of the corresponding first line, and the fourth terminal connected to the succeeding stage portion closer to the second terminal of the detour path of the corresponding first line, are provided for each block. In a block in which a broken display line has been repaired, by measuring an electrical resistance between the first terminal connected to the repaired display line and the third terminal, and an electrical resistance between the second terminal and the fourth terminal, a connection state between the repaired display line and the corresponding first line and a connection state between the corresponding first line and the second line can be confirmed.

The display apparatus may further include a plurality of film substrates each provided for a corresponding one of the blocks and attached to an end portion outside the display region of the display panel. The detour paths of the first lines may be provided on the respective film substrates. The first, second, third, and fourth terminals may be provided on each of the film substrates. The amplifier circuit may be incorporated in the drive circuit provided in each of the film substrates.

In the above configuration, for a block in which a broken display line has been repaired, by measuring an electrical resistance between one of the first terminals (connected to the repaired display line) provided on the film substrate including a drive circuit including an amplifier circuit, and the third terminal, and an electrical resistance between the second terminal and the fourth terminal, a connection state between the repaired display line and the first line, and a connection state between the first line and the second line, can be confirmed. Therefore, an advantage of the present disclosure is specifically achieved.

The display apparatus may include a printed substrate attached to end portions farther from the display panel of the film substrates. On the printed substrate, lines each linking the preceding stage portion and the succeeding stage portion of the detour path of the corresponding first line may be provided.

In the above configuration, the line linking the preceding stage portion and the succeeding stage portion is provided on the printed substrate in the detour path of each first line. Therefore, the line layout of the film substrate can be simplified, and the film substrate can be common to identical display apparatuses or other display apparatuses.

The plurality of display lines in each of the blocks may be divided into a plurality of line groups. The first lines may each be provided for a corresponding one of the line groups.

In the above configuration, in each block including a plurality of line groups of display lines, a first line and an amplifier circuit are provided for each line group. Therefore, the difference between signal delays depending on the position of a block in which a broken display line occurs can be further reduced or prevented.

Each of the display lines may be a source line to which a source signal is input as the display signal.

In the above configuration, a broken source line can be easily repaired on the display panel as follows. An intersection of a portion closer to the drive circuit of the broken source line and the corresponding first line, an intersection of a portion farther than the drive circuit of the broken source line and the second line, and an intersection of the corresponding first line and the second line, i.e., only three portions of the display panel, are irradiated with, for example, laser light to establish conduction between each line. Thus, a broken source line can be easily repaired.

An example method for manufacturing a display apparatus according to the present disclosure is provided. The display apparatus includes a display panel having a display region including a plurality of blocks extending in parallel with each other. The display panel includes a plurality of display lines provided in each of the blocks and extending in parallel with each other and in a direction in which the blocks extend, a plurality of drive circuits each provided outside the display region for a corresponding one of the blocks and connected to the display lines in the corresponding block, a plurality of first lines each provided outside the display region for a corresponding one of the blocks and intersecting end portions closer to the corresponding drive circuit of the display lines in the corresponding block, the first lines being insulated from the display lines, and a second line provided outside the display region and intersecting end portions farther from the drive circuits of the display lines of all the blocks, the second line being insulated from the display lines. The second line is configured to intersect the first lines while being insulated from the first lines, and be supplied with a display signal from each of the drive circuits via an amplifier circuit. The method includes a broken-line detection step of detecting the presence of a break in the display lines, and a broken-line repairing step of irradiating, with laser light, intersections of the display line in which a break has been detected in the broken-line detection step, and the corresponding first line and the second line, and an intersection of the corresponding first line and the second line.

In the above method, outside the display region including the blocks extending in parallel with each other, the first lines inserting the end portions closer to the drive circuits of the display lines extending in parallel with each other in the respective blocks, the first lines being insulated from the display lines, intersect the second line inserting the end portions farther than the drive circuits of the display lines in all the blocks, the second line being insulated from the display lines, where the first lines are insulated from the second line. Therefore, intersections of the first lines and the display lines in the respective blocks, intersections of the second line and the display lines in all the blocks, and intersections of the first lines and the second line are provided outside the display region of the display panel. Therefore, a broken display line can be repaired as follows. Specifically, if any one of all the display lines provided on the display panel is broken, the broken display line is detected in the broken-line detection step, and the broken display line is repaired in the broken-line repairing step. In this case, an intersection of a portion closer to the driver circuit of the broken display line and the corresponding first line, an intersection of a portion farther from the driver circuit of the broken display line and the second line, and an intersection of the corresponding first line and the second line, i.e., only three portions of the display panel, are irradiated with laser light to establish conduction between each line. In addition, the second line is configured to be supplied with a display signal from each drive circuit via an amplifier circuit. Therefore, by establishing conduction between each line in the above-described manner, a display signal from a drive circuit is amplified by an amplifier circuit and then supplied to a portion farther than a break portion of a broken display line. As a result, when a broken display line is repaired, the display panel is the only target to be irradiated with laser light, and therefore, conditions for irradiation with the laser light are simplified, whereby the broken display line can be easily repaired.

Another example method for manufacturing a display apparatus according to the present disclosure is provided. The display apparatus includes a display panel having a display region including a plurality of blocks extending in parallel with each other. The display panel includes a plurality of display lines provided in each of the blocks and extending in parallel with each other and in a direction in which the blocks extend, a plurality of drive circuits each provided outside the display region for a corresponding one of the blocks and connected to the display lines in the corresponding block, a plurality of first lines each provided outside the display region for a corresponding one of the blocks and intersecting end portions closer to the corresponding drive circuit of the display lines in the corresponding block, the first lines being insulated from the display lines, and a second line provided outside the display region and intersecting end portions farther from the drive circuits of the display lines of all the blocks, the second line being insulated from the display lines. The second line is configured to intersect the first lines while being insulated from the first lines. An amplifier circuit is provided in each of the first lines. The method includes a broken-line detection step of detecting the presence of a break in the display lines, and a broken-line repairing step of irradiating, with laser light, intersections of the display line in which a break has been detected in the broken-line detection step, and the corresponding first line and the second line, and an intersection of the corresponding first line and the second line.

In the above method, outside the display region including the blocks extending in parallel with each other, the first lines inserting the end portions closer to the drive circuits of the display lines extending in parallel with each other in the respective blocks, the first lines being insulated from the display lines, intersect the second line inserting the end portions farther than the drive circuits of the display lines in all the blocks, the second line being insulated from the display lines, where the first lines are insulated from the second line. Therefore, intersections of the first lines and the display lines in the respective blocks, intersections of the second line and the display lines in all the blocks, and intersections of the first lines and the second line are provided outside the display region of the display panel. Therefore, a broken display line can be repaired as follows. Specifically, if any one of all the display lines provided on the display panel is broken, the broken display line is detected in the broken-line detection step, and the broken display line is repaired in the broken-line repairing step. In this case, an intersection of a portion closer to the driver circuit of the broken display line and the corresponding first line, an intersection of a portion farther from the driver circuit of the broken display line and the second line, and an intersection of the corresponding first line and the second line, i.e., only three portions of the display panel, are irradiated with laser light to establish conduction between each line. In addition, the amplifier circuit is provided in each first line. Therefore, by establishing conduction between each line in the above-described manner, a display signal from a drive circuit is amplified by an amplifier circuit and then supplied to a portion farther than a break portion of a broken display line. As a result, when a broken display line is repaired, the display panel is the only target to be irradiated with laser light, and therefore, conditions for irradiation with the laser light are simplified, whereby the broken display line can be easily repaired.

The amplifier circuit may be provided in a portion of each of the first lines between an intersection of the first line and the second line and intersections of the first line and the corresponding display lines. The portion of each of the first lines between the intersection of the first line and the second line and the intersections of the first line and the corresponding display lines may make a detour to temporarily pass through a region farther from the display region. For each of the blocks, a plurality of first terminals connected to the respective display lines, a second terminal connected to the second line, a third terminal connected to a preceding stage portion closer to the plurality of first terminals of a detour path of the corresponding first line, and a fourth terminal connected to a succeeding stage portion closer to the second terminal of the detour path of the corresponding first line, the first to fourth terminals being provided outside the display region. The method may further include, after the broken-line repairing step, a repair confirmation step of measuring an electrical resistance between the first terminal connected to the display line which has been irradiated with laser light in the broken-line repairing step, and the third terminal connected to the preceding stage portion of the first line which has been irradiated with laser light in the broken-line repairing step, and an electrical resistance between the second terminal connected to the second line which has been irradiated with laser light in the broken-line repairing step, and the fourth terminal connected to the succeeding stage portion of the first line which has been irradiated with laser light in the broken-line repairing step.

In the repair confirmation step of the above method, a portion having a faulty connection can be easily identified in a block in which a broken display line has been repaired, by measuring an electrical resistance between the first terminal connected to the repaired display line, and the third terminal, and an electrical resistance between the second terminal and the fourth terminal to confirm a connection state between the repaired display line and the corresponding first line, and a connection state between the corresponding first line and the second line.

An example active matrix substrate of the present disclosure is an active matrix substrate having a display region including a plurality of blocks extending in parallel with each other, including a plurality of display lines provided in each of the blocks and extending in parallel with each other and in a direction in which the blocks extend, a plurality of drive circuits each provided outside the display region for a corresponding one of the blocks and connected to the display lines in the corresponding block, a plurality of first lines each provided outside the display region for a corresponding one of the blocks and intersecting end portions closer to the corresponding drive circuit of the display lines in the corresponding block, the first lines being insulated from the display lines, and a second line provided outside the display region and intersecting end portions farther from the drive circuits of the display lines of all the blocks, the second line being insulated from the display lines. The second line is configured to intersect the first lines while being insulated from the first lines, and be supplied with a display signal from each of the drive circuits via an amplifier circuit.

In the above configuration, outside the display region including the blocks extending in parallel with each other, the first lines inserting the end portions closer to the drive circuits of the display lines extending in parallel with each other in the respective blocks, the first lines being insulated from the display lines, intersect the second line inserting the end portions farther than the drive circuits of the display lines in all the blocks, the second line being insulated from the display lines, where the first lines are insulated from the second line. Therefore, intersections of the first lines and the display lines in the respective blocks, intersections of the second line and the display lines in all the blocks, and intersections of the first lines and the second line are provided outside the display region of the active matrix substrate. Therefore, a broken display line can be repaired as follows. Specifically, if any one of all the display lines provided on the active matrix substrate is broken, an intersection of a portion closer to the driver circuit of the broken display line and the corresponding first line, an intersection of a portion farther from the driver circuit of the broken display line and the second line, and an intersection of the corresponding first line and the second line, i.e., only three portions of the active matrix substrate, are irradiated with laser light to establish conduction between each line. In addition, the second line is configured to be supplied with a display signal from each drive circuit via an amplifier circuit. Therefore, by establishing conduction between each line in the above-described manner, a display signal from a drive circuit is amplified by an amplifier circuit and then supplied to a portion farther than a break portion of a broken display line. As a result, when a broken display line is repaired, the active matrix substrate is the only target to be irradiated with laser light, and therefore, conditions for irradiation with the laser light are simplified, whereby the broken display line can be easily repaired.

Another example active matrix substrate of the present disclosure is an active matrix substrate having a display region including a plurality of blocks extending in parallel with each other, including a plurality of display lines provided in each of the blocks and extending in parallel with each other and in a direction in which the blocks extend, a plurality of drive circuits each provided outside the display region for a corresponding one of the blocks and connected to the display lines in the corresponding block, a plurality of first lines each provided outside the display region for a corresponding one of the blocks and intersecting end portions closer to the corresponding drive circuit of the display lines in the corresponding block, the first lines being insulated from the display lines, and a second line provided outside the display region and intersecting end portions farther from the drive circuits of the display lines of all the blocks, the second line being insulated from the display lines. The second line is configured to intersect the first lines while being insulated from the first lines. An amplifier circuit is provided in each of the first lines.

In the above configuration, outside the display region including the blocks extending in parallel with each other, the first lines inserting the end portions closer to the drive circuits of the display lines extending in parallel with each other in the respective blocks, the first lines being insulated from the display lines, intersect the second line inserting the end portions farther than the drive circuits of the display lines in all the blocks, the second line being insulated from the display lines, where the first lines are insulated from the second line. Therefore, intersections of the first lines and the display lines in the respective blocks, intersections of the second line and the display lines in all the blocks, and intersections of the first lines and the second line are provided outside the display region of the active matrix substrate. Therefore, a broken display line can be repaired as follows. Specifically, if any one of all the display lines provided on the active matrix substrate is broken, an intersection of a portion closer to the driver circuit of the broken display line and the corresponding first line, an intersection of a portion farther from the driver circuit of the broken display line and the second line, and an intersection of the corresponding first line and the second line, i.e., only three portions of the active matrix substrate, are irradiated with laser light to establish conduction between each line. In addition, the amplifier circuit is provided in each first line. Therefore, by establishing conduction between each line in the above-described manner, a display signal from a drive circuit is amplified by an amplifier circuit and then supplied to a portion farther than a break portion of a broken display line. As a result, when a broken display line is repaired, the active matrix substrate is the only target to be irradiated with laser light, and therefore, conditions for irradiation with the laser light are simplified, whereby the broken display line can be easily repaired.

According to the present disclosure, the first lines inserting the end portions closer to the drive circuits of the display lines extending in parallel with each other in the respective blocks, the first lines being insulated from the display lines, intersect the second line inserting the end portions farther than the drive circuits of the display lines in all the blocks on a display panel, the second line being insulated from the display lines, where the first lines are insulated from the second line. Therefore, a broken display line can be easily repaired.

BRIEF DESCRIPTION OF THE DRAWINGS

FIG. 3 is a plan view showing a single pixel of an active matrix substrate 20a included in the liquid crystal display apparatus 50a.

DETAILED DESCRIPTION

Embodiments of the present disclosure will be described in detail hereinafter with reference to the accompanying drawings. Note that the present disclosure is not limited to the embodiments described below.

First Embodiment

FIGS. 1-5 show a display apparatus, a method for manufacturing the display apparatus, and an active matrix substrate according to a first embodiment of the present disclosure.

Figure 1:
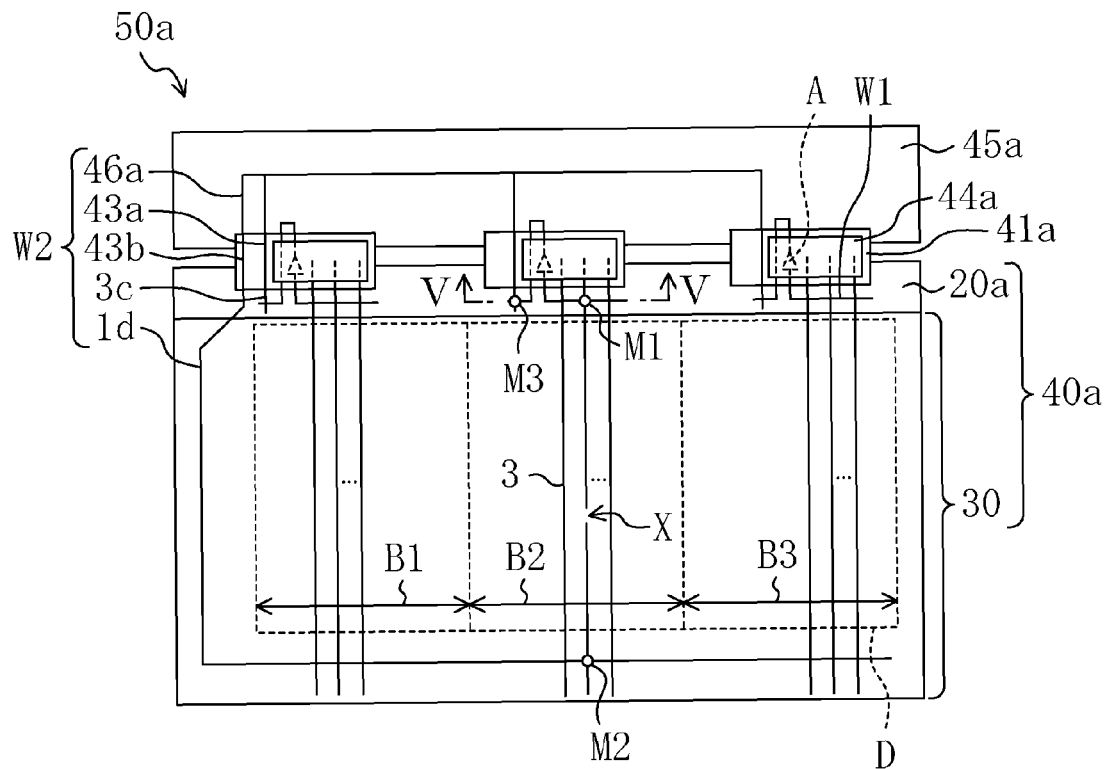
FIG. 1 is a plan view of a liquid crystal display apparatus 50a according to a first embodiment.
Figure 2:
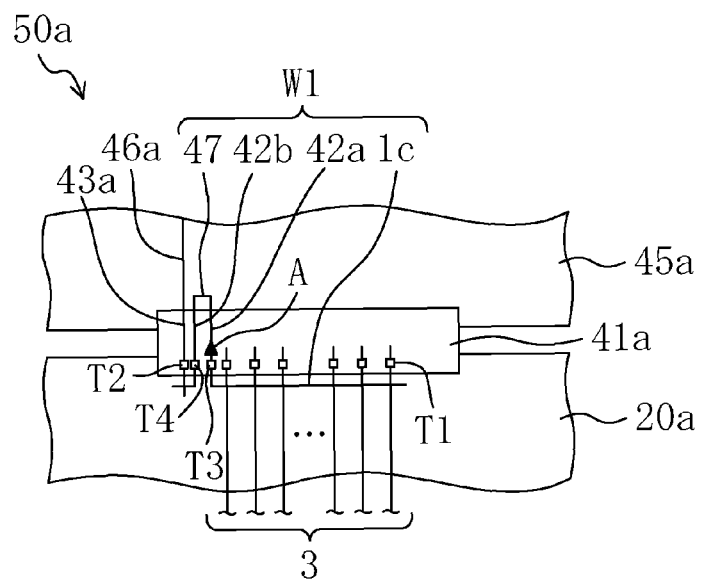
FIG. 2 is an enlarged plan view of a film substrate 41a included in the liquid crystal display apparatus 50a and a surrounding configuration thereof.
Figure 3:
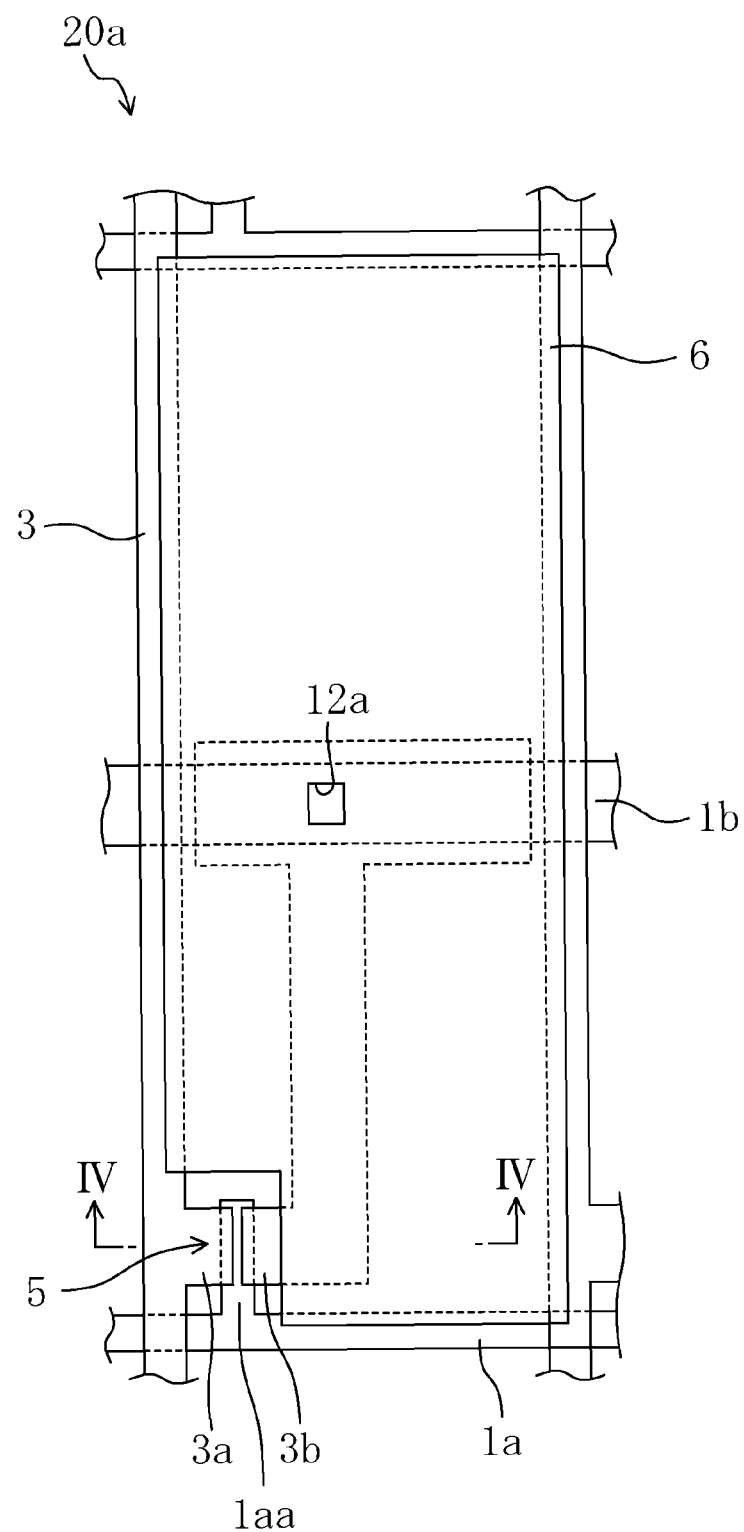
Figure 4:
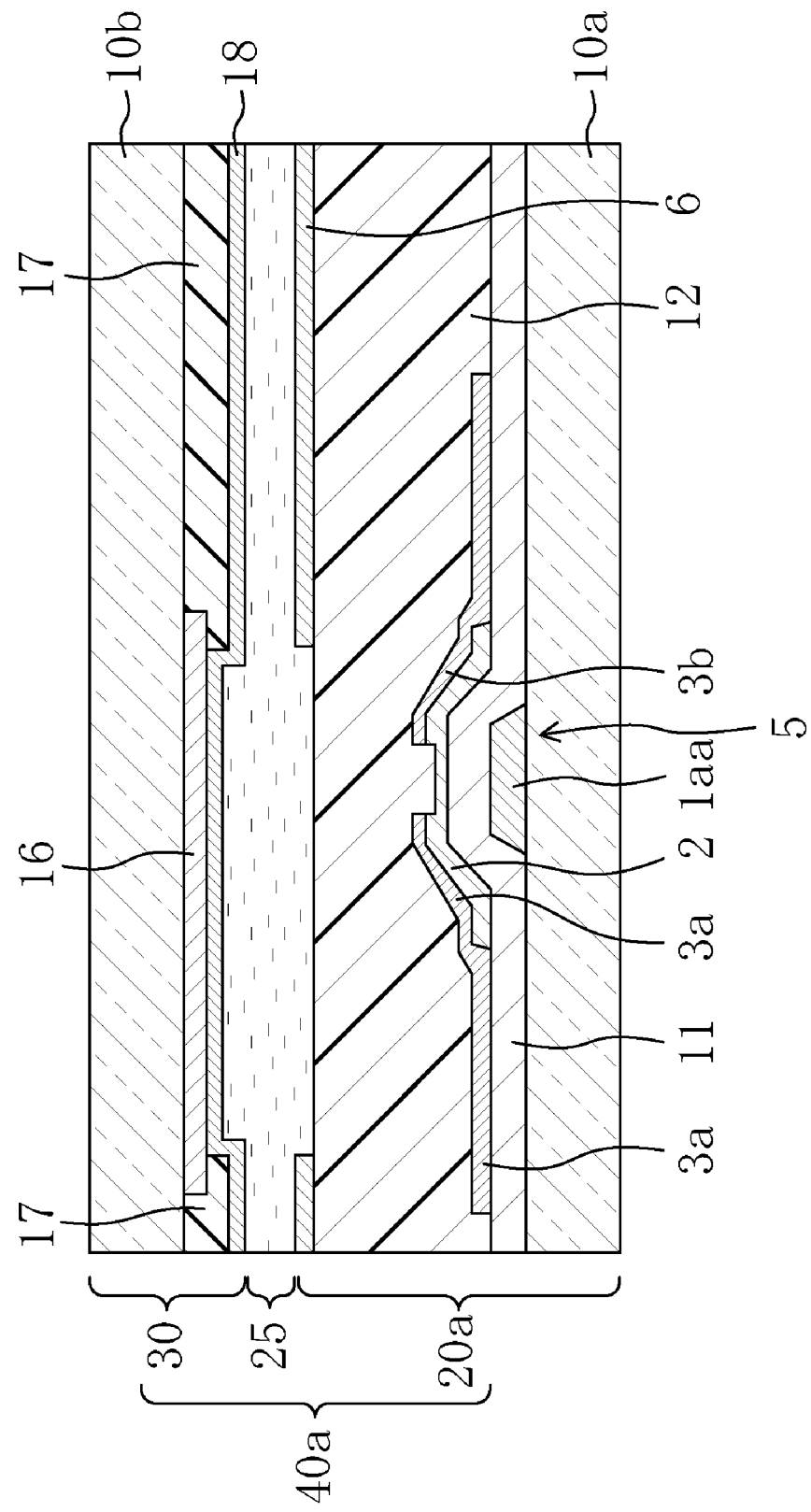
FIG. 4 is a cross-sectional view of the active matrix substrate 20a and a liquid crystal display panel 40a including the active matrix substrate 20a, taken along line IV-IV of FIG. 3.
Figure 5:
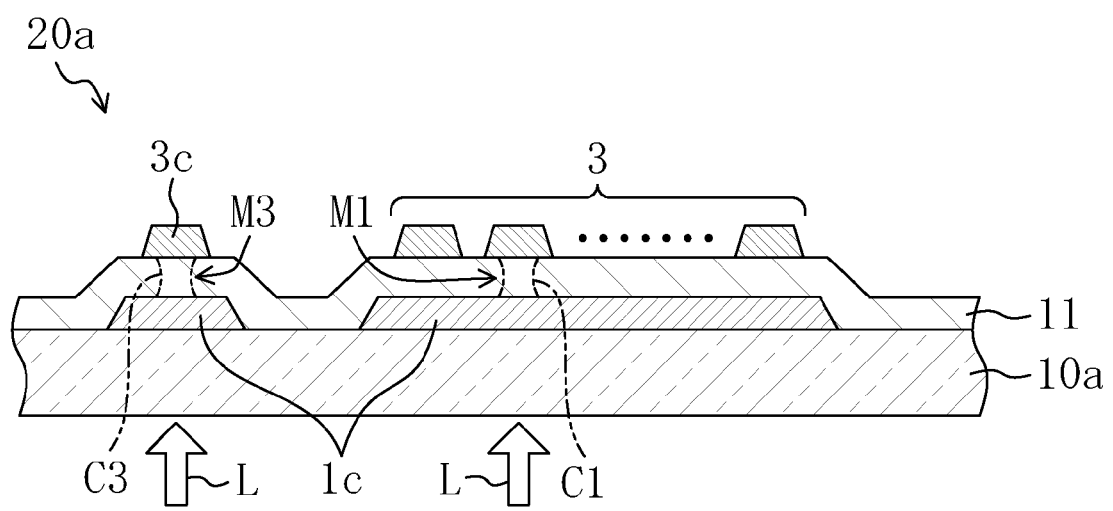
FIG. 5 is a cross-sectional view of the active matrix substrate 20a, taken along line V-V of FIG. 1.

Specifically, FIG. 1 is a plan view of a liquid crystal display apparatus 50a according to this embodiment. FIG. 2 is an enlarged plan view of a film substrate 41a included in the liquid crystal display apparatus 50a and a surrounding configuration thereof. FIG. 3 is a plan view showing a single pixel of an active matrix substrate 20a included in the liquid crystal display apparatus 50a. FIG. 4 is a cross-sectional view of the active matrix substrate 20a and a liquid crystal display panel 40a including the active matrix substrate 20a, taken along line IV-IV of FIG. 3. FIG. 5 is a cross-sectional view of the active matrix substrate 20a, taken along line V-V of FIG. 1.

As shown in FIG. 1, the liquid crystal display apparatus 50a includes the liquid crystal display panel 40a, three film substrates 41a attached to an upper end of the liquid crystal display panel 40a with an anisotropic conductive film (ACF, not shown) being interposed therebetween, and a printed substrate 45a attached to upper ends of the film substrates 41a with ACF (not shown) being interposed therebetween.

As shown in FIGS. 1 and 4, the liquid crystal display panel 40a includes the active matrix substrate 20a and a counter substrate 30 facing each other, and a liquid crystal layer 25 interposed between the active matrix substrate 20a and the counter substrate 30.

As shown in FIG. 1, the liquid crystal display panel 40a has a display region D for displaying an image, which is a region where the active matrix substrate 20a and the counter substrate 30 overlap. As shown in FIG. 1, the display region D has three blocks B1-B3 extending in parallel with each other.

As shown in FIGS. 1, 3, and 4, the active matrix substrate 20a includes, in the display region D, a plurality of gate lines 1a (display lines) provided on the insulating substrate 10a and extending in parallel with each other, a plurality of capacitor lines 1b each provided between the corresponding gate lines 1a and extending in parallel with each other, a gate insulating film 11 covering the gate lines 1a and the capacitor lines 1b, a plurality of source lines 3 (display lines) provided on the gate insulating film 11 and extending in parallel with each other in a direction perpendicular to the gate lines 1a (a direction in which the blocks B1-B3 extend), a plurality of thin film transistors (TFT) 5 each provided at an intersection of the corresponding gate line 1a and source line 3, an interlayer insulating film 12 covering the TFTs 5 and the source lines 3, a plurality of pixel electrodes 6 provided in a matrix on the interlayer insulating film 12, and an alignment film (not shown) covering the pixel electrodes 6.

As shown in FIGS. 3 and 4, the TFTs 5 each include a gate electrode 1aa protruding laterally from the corresponding gate line 1a, the gate insulating film 11 covering the gate electrode 1aa, an island-like semiconductor layer 2 on the gate insulating film 11 at a position corresponding to the gate electrode 1aa, and a source electrode 3a and a drain electrode 3b provided on the semiconductor layer 2 and facing each other. Here, the source electrode 3a is a laterally protruding portion of the corresponding source line 3. The drain electrode 3b is extended to a region overlapping the corresponding capacitor line 1b, thereby forming an auxiliary capacitor, and is also connected to the pixel electrode 6 on the capacitor line 1b via a contact hole 12a formed in the interlayer insulating film 12.

As shown in FIGS. 1 and 2, the active matrix substrate 20a includes, outside the display region D, three on-panel first lines 1c extending along an upper edge of the substrate and intersecting the upper end portions (FIG. 1) of the source lines 3 of the respective blocks B1-B3, three on-panel second line preceding stage portions 3c intersecting left end portions of the respective on-panel first lines 1c, and an L-shaped on-panel second line succeeding stage portion 1d extending along a left edge and a bottom edge of the substrate and intersecting the lower end portions (FIG. 1) of the source lines 3 of all the blocks B1-B3.

As shown in FIG. 4, the counter substrate 30 includes an insulating substrate 10b, a black matrix 16 provided on the insulating substrate 10b and having the shape of a frame with a grid therein, a color filter 17 including a red layer, a green layer, and a blue layer, which is provided between each grid bar of the black matrix 16, a common electrode 18 covering the black matrix 16 and the color filter 17, columnar photo-spacers (not shown) provided on the common electrode 18, and an alignment film (not shown) covering the common electrode 18.

The liquid crystal layer 25 is formed of, for example, a nematic liquid crystal material having electro-optic properties.

The film substrates 41a are each, for example, a tape carrier package (TCP). As shown in FIGS. 1 and 2, the film substrate 41a includes an on-film-substrate first line preceding stage portion 42a connected to a preceding stage portion of the corresponding on-panel first line 1c on the active matrix substrate 20a with ACF (not shown) being interposed therebetween, an on-film-substrate first line succeeding stage portion 42b extending on the left side of and adjacent to the on-film-substrate first line preceding stage portion 42a and connected to a succeeding stage portion of the corresponding on-panel first line 1c on the active matrix substrate 20a with ACF (not shown) being interposed therebetween, an on-film-substrate second line preceding stage portion 43a extending on the left side of and adjacent to the on-film-substrate first line succeeding stage portion 42b and connected to the corresponding on-panel second line preceding stage portion 3c on the active matrix substrate 20a with ACF (not shown) being interposed therebetween, a source driver 44a (drive circuit) provided on the substrate and connected to the corresponding source lines 3 on the active matrix substrate 20a, an amplifier circuit A incorporated in the source driver 44a and provided on a path of the on-film-substrate first line preceding stage portion 42a, a plurality of first terminals T1 connected to the respective corresponding source lines 3 on the active matrix substrate 20a with ACF (not shown) being interposed therebetween, a second terminal T2 connected to the on-film-substrate second line preceding stage portion 43a, a third terminal T3 connected to the on-film-substrate first line preceding stage portion 42a, and a fourth terminal T4 connected to the on-film-substrate first line succeeding stage portion 42b. Here, as shown in FIG. 1, the leftmost film substrate 41a includes an on-film-substrate second line succeeding stage portion 43b connected to the on-panel second line succeeding stage portion 1d on the active matrix substrate 20a with ACF (not shown) being interposed therebetween. Note that, in FIG. 2, the source driver 44a is not shown in the film substrate 41a.

The printed substrate 45a is, for example, a printed wiring board (PWB). As shown in FIGS. 1 and 2, the printed substrate 45a includes on-printed-substrate second lines 46a each linking the on-film-substrate second line preceding stage portion 43a on the corresponding film substrate 41a and the on-film-substrate second line succeeding stage portion 43b on the leftmost film substrate 41a with ACF (not shown) being interposed therebetween, and on-printed-substrate first lines 47 each linking the on-film-substrate first line preceding stage portion 42a and the on-film-substrate first line succeeding stage portion 42b on the corresponding film substrate 41a with ACF (not shown) being interposed therebetween.

Here, as shown in FIG. 2, a first line W1 includes the on-panel first line 1c, the on-film-substrate first line preceding stage portion 42a, the on-printed-substrate first line 47, and the on-film-substrate first line succeeding stage portion 42b. As shown in FIG. 1, a second line W2 includes the on-panel second line preceding stage portion 3c, the on-film-substrate second line preceding stage portion 43a, the on-printed-substrate second line 46a, the on-film-substrate second line succeeding stage portion 43b, and the on-panel second line succeeding stage portion 1d. As shown in FIGS. 1 and 2, a portion of the first line W1 between an intersection (M3) of the first line W1 and the second line W2 and intersections (M1, etc.) of the first line W1 and the corresponding source lines 3 makes a detour to temporarily pass through a region farther from the display region D.

In the liquid crystal display apparatus 50a thus configured, in each pixel, which is a minimum unit of an image, when a gate signal is transferred from the gate driver via the gate line 1a to the gate electrode 1aa, so that the TFT 5 is turned on, a source signal is transferred from the source driver 44a via the source line 3 to the source electrode 3a, so that predetermined charge is written via the semiconductor layer 2 and the drain electrode 3b to the pixel electrode 6. In this case, a potential difference occurs between the pixel electrode 6 of the active matrix substrate 20a and the common electrode 18 of the counter substrate 30, whereby predetermined voltage is applied to the liquid crystal layer 25. Also, in the liquid crystal display apparatus 50a, an image is displayed by changing the alignment state of the liquid crystal layer 25 according to the magnitude of the voltage applied to the liquid crystal layer 25 to adjust the light transmittance of the liquid crystal layer 25.

Next, an example method for manufacturing (and method for repairing) the liquid crystal display apparatus 50a of this embodiment will be described. The manufacturing method of this embodiment includes an active matrix substrate fabrication step, a counter substrate fabrication step, a liquid crystal display panel fabrication step, a broken-line detection step, a broken-line repairing step, a repair confirmation step, and a mounting step.

<Active Matrix Substrate Fabrication Step>

Initially, for example, a titanium film, an aluminum film, and a titanium film are successively formed on an entirety of the insulating substrate 10a, such as a glass substrate, etc., by sputtering. Thereafter, patterning is performed by photolithography to form the gate lines 1a, the gate electrodes 1aa, the capacitor lines 1b, the on-panel first lines 1c, and the on-panel second line succeeding stage portion 1d, which have a thickness of about 4000 Å.

Next, for example, a silicon nitride film is formed, by plasma-enhanced chemical vapor deposition (CVD), on an entirety of the substrate on which the gate lines 1a, the gate electrodes 1aa, the capacitor lines 1b, the on-panel first lines 1c, and the on-panel second line succeeding stage portion 1d have been formed, thereby forming the gate insulating film 11 having a thickness of about 4000 Å.

Moreover, an intrinsic amorphous silicon film and a phosphorus-doped $n^+$ amorphous silicon film are successively formed, by plasma-enhanced CVD, on an entirety of the substrate on which the gate insulating film 11 has been formed. Thereafter, patterning is performed by photolithography to form an island-like pattern on the gate electrodes 1aa. As a result, a semiconductor layer formation layer is formed in which the intrinsic amorphous silicon layer having a thickness of about 2000 Å and the $n^+$ amorphous silicon layer having a thickness of about 500 Å are stacked.

Thereafter, for example, an aluminum film and a titanium film are formed, by sputtering, on an entirety of the substrate on which the semiconductor layer formation layer has been formed. Thereafter, patterning is performed by photolithography to form the source lines 3, the source electrodes 3a, the drain electrodes 3b, and the on-panel second line preceding stage portions 3c, which have a thickness of about 2000 Å.

Next, the $n^+$ amorphous silicon layer of the semiconductor layer formation layer is etched using the source electrodes 3a and the drain electrodes 3b as a mask, i.e., patterning is performed, to form channel portions, thereby forming the semiconductor layer 2 and the TFTs 5 including the semiconductor layer 2.

Moreover, for example, a photosensitive acrylic resin is applied, by spin coating, onto an entirety of the substrate on which the TFTs 5 have been formed. Thereafter, the applied photosensitive resin is exposed to light via a photomask and then developed to form the interlayer insulating film 12 having the contact holes 12a on the drain electrodes 3b, which has a thickness of about 2 μm.

Thereafter, for example, an indium tin oxide (ITO) film is formed, by sputtering, on an entirety of the substrate on which the interlayer insulating film 12 has been formed. Thereafter, patterning is performed by photolithography to form the pixel electrodes 6 having a thickness of about 1000 Å.

Finally, a polyimide resin is applied, by a printing method, onto an entirety of the substrate on which the pixel electrodes 6 have been formed. Thereafter, a rubbing treatment is performed to form an alignment film having a thickness of about 1000 Å.

Thus, the active matrix substrate 20a can be fabricated.

<Counter Substrate Fabrication Step>

Initially, for example, a photosensitive acrylic resin in which fine particles made of carbon, etc., are dispersed is applied, by spin coating, onto an entirety of the insulating substrate 10b, such as a glass substrate, etc. The applied photosensitive resin is exposed to light via a photomask and then developed to form the black matrix 16 having a thickness of about 1.5 μm.

Next, for example, a red, green, or blue colored photosensitive acrylic resin is applied onto the substrate on which the black matrix 16 has been formed. The applied photosensitive resin is exposed to light via a photomask, followed by development (i.e., patterning is performed), to form a colored layer having a selected color (e.g., a red layer) having a thickness of about 2.0 μm. A similar process is repeated to form colored layers having the other colors (e.g., a green layer and a blue layer) having a thickness of about 2.0 μm. As a result, the color filter 17 is formed.

Moreover, for example, an ITO film is formed, by sputtering, on the substrate on which the color filter 17 has been formed, to form the common electrode 18 having a thickness of about 1500 Å.

Thereafter, a photosensitive phenol novolac resin is applied, by spin coating, onto an entirety of the substrate on which the common electrode 18 has been formed. The applied photosensitive resin is exposed to light via a photomask and then developed to form photospacers having a thickness of about 4 μm.

Finally, a polyimide resin is applied, by printing, on an entirety of the substrate on which the photospacers have been formed. Thereafter, a rubbing treatment is performed to form an alignment film having a thickness of about 1000 Å.

Thus, the counter substrate 30 can be fabricated.

<Liquid Crystal Display Panel Fabrication Step>

Initially, for example, a sealing material made of an ultraviolet and thermal curing resin is applied (drawn) in the shape of a frame, using a dispenser, onto the counter substrate 30 which has been fabricated in the counter substrate fabrication step.

Next, a liquid crystal material is dropped into a region inside the sealing material of the counter substrate 30 on which the sealing material has been applied.

Moreover, the counter substrate 30 on which the liquid crystal material has been dropped and the active matrix substrate 20*a* which has been fabricated in the active matrix substrate fabrication step are joined with each other under reduced pressure. Thereafter, the joined substrates are exposed to the atmosphere so that pressure is applied on the outer surfaces of the joined substrates.

Finally, the sealing material interposed between the joined substrates is irradiated with ultraviolet (UV) light and then heated so that the sealing material is cured.

Thus, the liquid crystal display panel 40*a* can be fabricated. Thereafter, a polarizing plate is attached to each of the front and back surfaces of the liquid crystal display panel 40*a*. Note that the polarizing plate may be attached before the broken-line detection step or in the mounting step described below. Here, when the polarizing plate is attached in the mounting step, the polarizing plate is attached to each of the front and back surfaces of the liquid crystal display panel 40*a* in which a broken line has not been detected in the broken-line detection step or in which a broken line has been repaired in the broken-line repairing step and the repair confirmation step.

Thereafter, the broken-line detection step described below is performed with respect to the liquid crystal display panel 40*a* thus fabricated. When the presence of a break has been detected in a source line 3, the break is repaired by the broken-line repairing step, and thereafter, a connection state between the repaired source line 3 and other lines is confirmed by the repair confirmation step.

<Broken-Line Detection Step>

For example, a gate test signal which is a +15-V pulse voltage having a bias voltage of −10 V, a period of 16.7 msec, and a pulse width of 50 μsec is input to each gate line 1*a* so that all the TFTs 5 are turned on. Moreover, a source test signal having a potential of ±2 V whose polarity is reversed every 16.7 msec is input to each source line 3 so that an amount of charge corresponding to ±2 V is written via the source electrode 3*a* and the drain electrode 3*b* of each TFT 5 to the pixel electrode 6. At the same time, a common electrode test signal which is a direct current having a potential of −1 V is input to the common electrode 18.

In this case, a voltage is applied to a liquid crystal capacitor formed between the pixel electrode 6 and the common electrode 18, so that a pixel formed by the pixel electrode 6 is turned on, i.e., white display is changed to black display in the case of the normally white mode (white display is obtained in the absence of voltage application). In this case, if a light source is provided at the back of the liquid crystal display panel 40*a*, the display state can be visually confirmed.

Note that, in the liquid crystal display panel fabrication step, when a polarizing plate is not attached to the liquid crystal display panel 40*a*, a polarizing plate is placed at the front of the liquid crystal display panel 40*a*, and a polarizing plate is provided between the liquid crystal display panel 40*a* and a light source, to confirm the display state.

For a pixel on a source line 3 having a break, a predetermined amount of charge cannot be written to the pixel electrode 6, and therefore, the pixel is not turned on (bright spot), whereby a break portion (portion X) of the source line 3 is detected.

<Broken-Line Repairing Step>

As shown in FIG. 5, an intersection M1 of the source line 3 on which a break has been detected at the portion X in the broken-line detection step and the corresponding first line W1 (the on-panel first line 1*c*), an intersection M2 of that source line 3 and the second line W2 (the on-panel second line succeeding stage portion 1*d*), and an intersection M3 of the corresponding first line W1 (the on-panel first line 1*c*) and the second line W2 (the on-panel second line preceding stage portion 3*c*) are irradiated with laser light L emitted by a YAG laser, etc., through the insulating substrate 10*a*. As a result, contact holes C1-C3 (C2 is not shown) are formed in the gate insulating film 11 at the intersections M1-M3 so that the metal layers forming the lines are fused. As a result, conduction is established between an upper portion (FIG. 1) of the broken source line 3 and the corresponding first line W1, between a lower portion (FIG. 1) of the broken source line 3 and the second line W2, and between the corresponding first line W1 and the second line W2.

<Repair Confirmation Step>

In the block B2 in which a broken line has been repaired in the broken-line repairing step, an electrical resistance between the first terminal T1 connected to the repaired source line 3 and the third terminal T3, and an electrical resistance between the second terminal T2 and the fourth terminal T4, are measured to confirm a connection state between the repaired source line 3 and the corresponding first line W1 and a connection state between the corresponding first line W1 and the second line W2. Note that if a faulty connection state has been confirmed, the intersection for which the fault has been confirmed is irradiated with laser light again (the connection is reworked) so that conduction between the lines is ensured.

<Mounting Step>

The three film substrates 41*a* are previously attached to the printed substrate 45*a* with ACF being interposed therebetween. The film substrates 41*a* are attached to the liquid crystal display panel 40*a* in which a broken line has not been detected in the broken-line detection step or the liquid crystal display panel 40*a* in which a broken line has been repaired in the broken-line repairing step and the repair confirmation step, with ACF being interposed therebetween.

Thus, the liquid crystal display apparatus 50*a* of this embodiment can be fabricated.

As described above, according to the liquid crystal display apparatus 50*a* of this embodiment and the manufacturing method therefor, the first lines W1 and the second line W2 are provided outside the display region D including the blocks B1-B3 extending in parallel with each other. Also, the first lines W1 intersecting end portions closer to the source drivers 44*a* of the source lines 3 extending in parallel with each other in the blocks B1-B3 (the first lines W1 and the source lines 3 are insulated from each other) intersect the second line W2 intersecting end portions farther from the source drivers 44*a* of the source lines 3 in all the blocks B1-B3 (the second line W2 and the source lines 3 are insulated from each other), where the first and second lines W1 and W2 are insulated from each other. Therefore, intersections (M1, etc.) of the first lines W1 and the source lines 3 in the respective blocks B1-B3, intersections (M2, etc.) of the second line W2 and the source lines 3 in all the blocks B1-B3, and the intersections (M3, etc.) of the first lines W1 and the second line W2 are provided outside the display region D of the liquid crystal display panel 40*a*. Therefore, a broken source line 3 can be easily repaired as follows. Specifically, if any one of all the source lines 3 provided on the liquid crystal display panel 40*a* is broken at a portion X, the broken line is detected in the broken-line detection step, and the broken line is repaired in the broken-line repairing step. In this case, an intersection M1 of a portion closer to the source driver 44*a* of the broken source line 3 and the corresponding first line W1, an intersection M2 of a portion farther from the source driver 44*a* of the broken source line 3 and the second line W2, and an intersection M3 of the corresponding first line W1 and the second line W2, i.e., only three portions of the liquid crystal display panel 40a, are irradiated with laser light L to establish conduction between each line. Also, the amplifier circuit A is provided for each first line W1, i.e., for each of the blocks B1-B3. Therefore, conduction is established between each line as described above while reducing or preventing a difference between signal delays depending on the positions of the blocks B1-B3 where a break occurs. As a result, a source signal from the source driver 44a is amplified by the amplifier circuit A and then supplied to a portion farther than the break portion of the broken source line 3. Thus, when a broken line is repaired, the liquid crystal display panel 40a is the only target to be irradiated with the laser light L, and therefore, conditions for irradiation with the laser light L are simplified, whereby the broken source line 3 can be easily repaired.

Moreover, according to the liquid crystal display apparatus 50a of this embodiment and the manufacturing method therefor, in each of the blocks B1-B3, the first terminals T1 connected to the source lines 3, the second terminal T2 connected to the second line W2, and the third terminal T3 and the fourth terminal T4 connected to the preceding stage portion (42a) closer to the first terminals T1 and the succeeding stage portion (42b) closer to the second terminal T2 on the detour path of the first line W1, respectively, are provided. In the repair confirmation step, in the block B2 where a broken line has been repaired, an electrical resistance between the first terminal T1 connected to the repaired source line 3 and the third terminal T3, and an electrical resistance between the second terminal T2 and the fourth terminal T4, are measured to confirm a connection state between the repaired source line 3 and the first line W1 and a connection state between the first line W1 and the second line W2, whereby a faulty connection portion can be easily identified. As a result, repairing of a broken line can be correctly reworked, thereby hindering or preventing a defective product in which a broken line has not been correctly repaired from being supplied to the next step.

Moreover, according to the liquid crystal display apparatus 50a of this embodiment and the manufacturing method therefor, in the blocks B1 and B3 other than the block B2 in which a broken line has been repaired, the first line W1 intersecting the source lines 3 is not connected to the second line W2, and therefore, the load of the second line W2 can be reduced. In other words, the signal delay of a repaired line can be reduced, and therefore, the success of repairing can be more reliably achieved.

The first lines may be each a plurality of lines intersecting each other with an insulating film being interposed therebetween (the lines overlap). When a broken line is repaired, an intersection (overlap) between lines is irradiated with laser light to link the lines, thereby forming the first line.

The second line may be each a plurality of lines intersecting each other with an insulating film being interposed therebetween (the lines overlap). When a broken line is repaired, an intersection (overlap) of lines is irradiated with laser light to link the lines, thereby forming the second line.

The film substrates 41a do not need to be all identical substrates. The film substrates 41a are, however, preferably all identical substrates in terms of cost reduction caused by volume production, manufacture management, etc.

Second Embodiment

Figure 6:
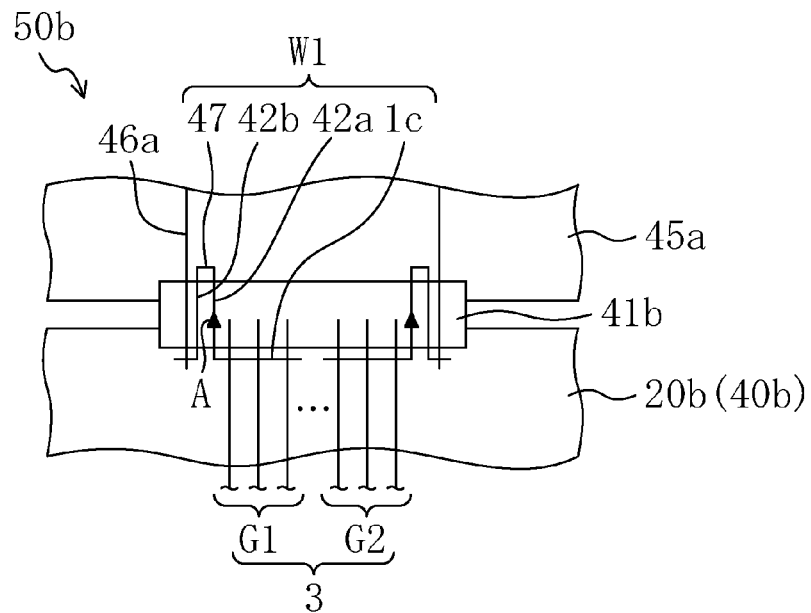
FIG. 6 is an enlarged plan view of a film substrate 41b included in a liquid crystal display apparatus 50b according to a second embodiment and a surrounding configuration thereof.

FIG. 6 is an enlarged plan view of a film substrate 41b included in a liquid crystal display apparatus 50b according to this embodiment and a surrounding configuration thereof. Note that the same parts as those of FIGS. 1-5 are indicated by the same reference characters in embodiments described below.

While a single first line W1 and a single amplifier circuit A are provided for each film substrate 41a in the first embodiment, two first lines W1 and two amplifier circuits A are provided for each film substrate 41b in this embodiment as shown in FIG. 6.

Specifically, as shown in FIG. 6, the liquid crystal display apparatus 50b of this embodiment includes an active matrix substrate 20b (liquid crystal display panel 40b) which includes a plurality of source lines 3. The source lines 3 are divided into blocks B1-B3. Each block includes two line groups G1 and G2 each including a plurality of source lines 3. As shown in FIG. 6, in the liquid crystal display apparatus 50b, a first line W1 and an amplifier circuit A are provided for each of the line groups G1 and G2.

According to the liquid crystal display apparatus 50b of this embodiment, as in the first embodiment, the liquid crystal display panel 40b is the only target to be irradiated with laser light L to repair a broken line. Therefore, a broken source line 3 can be easily repaired. In addition, in each of the blocks B1-B3 including the two line groups G1 and G2 of source lines 3, a first line W1 and an amplifier circuit A are provided for each of the line groups G1 and G2, and therefore, a difference between signal delays depending on the positions of the blocks B1-B3 where a break occurs can be further reduced or prevented. Moreover, as the number of source lines 3 included in each line group decreases, the load of a source line 3 in which a break has been repaired can be reduced, whereby a fault in display caused by a signal delay or other influences of a source signal can be reduced.

Third Embodiment

Figure 7:
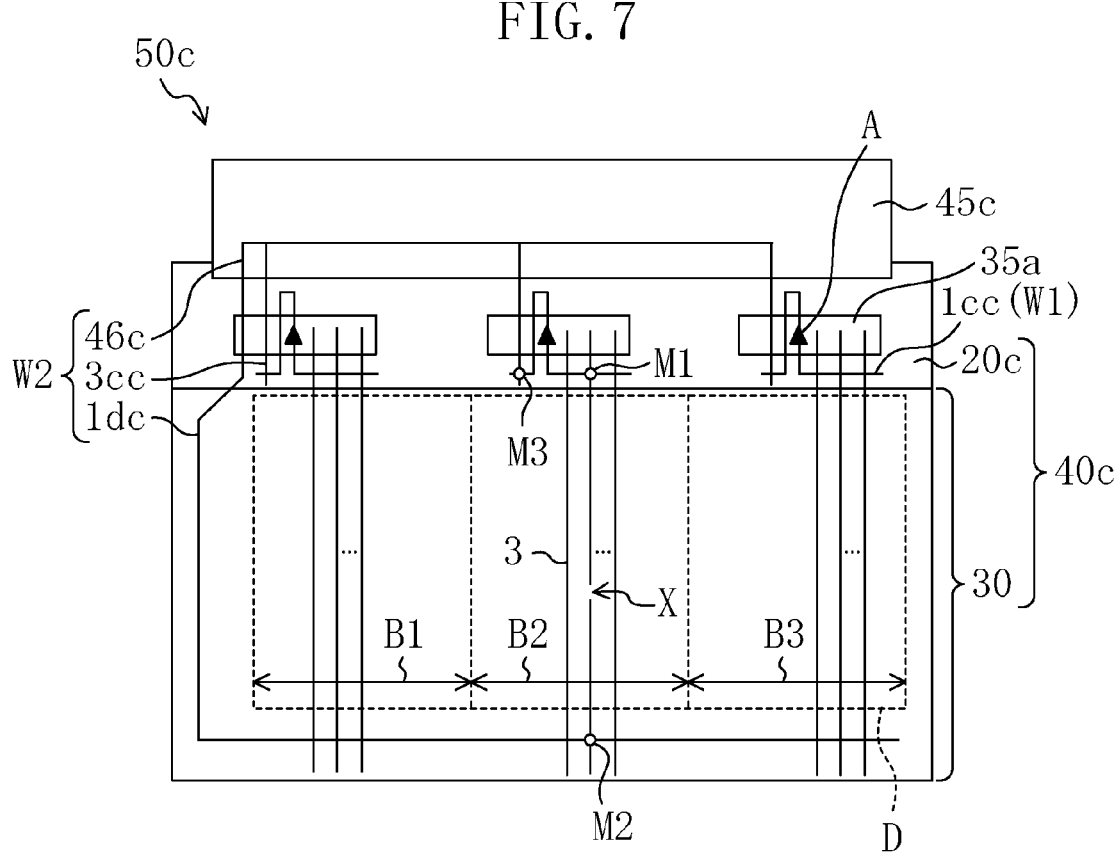
FIG. 7 is a plan view of a liquid crystal display apparatus 50c according to a third embodiment.

FIG. 7 is a plan view of a liquid crystal display apparatus 50c according to this embodiment.

While the source driver 44a is provided on the film substrates 41a and 41b in the first and second embodiments, a source driver 35a is provided on a liquid crystal display panel 40c (active matrix substrate 20c) in this embodiment.

As shown in FIG. 7, the liquid crystal display apparatus 50c includes the liquid crystal display panel 40c, and a film substrate 45c attached to an upper end of the liquid crystal display panel 40c with ACF (not shown) being interposed therebetween.

As shown in FIG. 7, the liquid crystal display panel 40c includes the active matrix substrate 20c and a counter substrate 30 facing each other.

The active matrix substrate 20c has a display region D having substantially the same configuration as that of the active matrix substrate 20a of the first embodiment. As shown in FIG. 7, the active matrix substrate 20c includes, outside the display region D, three on-panel first lines 1cc extending along an upper edge of the substrate and intersecting upper end portions of source lines 3 provided in respective blocks B1-B3, three on-panel second line preceding stage portions 3cc intersecting left end portions of the respective on-panel first lines 1cc, an L-shaped on-panel second line succeeding stage portion 1dc extending along a left edge and a bottom edge of the substrate and intersecting lower end portions of the source lines 3 of all the blocks B1-B3, and the source drivers 35a (drive circuits) provided in the respective blocks B1-B3 and connected to the source lines 3 of the respective blocks B1-B3.

The film substrates 45c are each, for example, a flexible printed circuit (FPC), etc. As shown in FIG. 7, the film substrate 45c includes an on-film-substrate second line 46c linking the on-panel second line preceding stage portions 3cc on the active matrix substrate 20c and the on-panel second line succeeding stage portion 1dc with ACF (not shown) being interposed therebetween.

Here, as shown in FIG. 7, the second line W2 includes the on-panel second line preceding stage portions 3cc, the on-film-substrate second line 46c, and the on-panel second line succeeding stage portion 1dc. As shown in FIG. 7, a portion of the first line 1cc (W1) between an intersection (M3) of the first line 1cc and the second line W2 and intersections (M1, etc.) of the first line 1cc and the corresponding source lines 3 makes a detour to temporarily pass through a region farther from the display region D.

The liquid crystal display apparatus 50c having the above configuration can be manufactured by changing the line patterns in the method of fabricating the active matrix substrate 20a of the first embodiment and mounting the source drivers 35a and the film substrate 45c thereonto.

According to the liquid crystal display apparatus 50c of this embodiment and the manufacturing method therefor, as in the first and second embodiments, the liquid crystal display panel 40c is the only target to be irradiated with laser light L to repair a broken line. Therefore, a broken source line 3 can be easily repaired.

Fourth Embodiment

Figure 8:
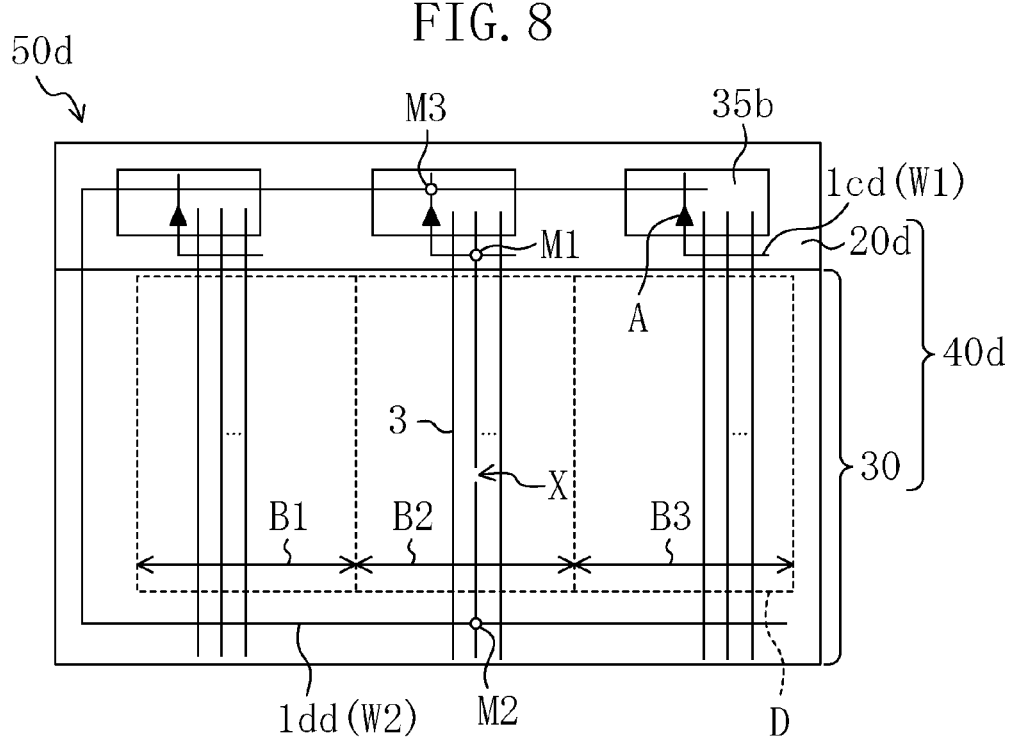
FIG. 8 is a plan view of a liquid crystal display apparatus 50d according to a fourth embodiment.

FIG. 8 is a plan view of a liquid crystal display apparatus 50d according to this embodiment.

While a portion of the second line W2 is provided on the external substrate attached to the liquid crystal display panel in the first to third embodiments, the entire second line W2 is provided on a liquid crystal display panel 40d (active matrix substrate 20d) in this embodiment.

As shown in FIG. 8, the liquid crystal display apparatus 50d, i.e., the liquid crystal display panel 40d, includes an active matrix substrate 20d and a counter substrate 30 facing each other.

The active matrix substrate 20d has a display region D having substantially the same configuration as that of the active matrix substrate 20a of the first embodiment. As shown in FIG. 8, the active matrix substrate 20d includes, outside the display region D, three L-shaped first lines 1cd (W1) extending along an upper edge of the substrate and intersecting upper end portions of source lines 3 provided in respective blocks B1-B3, an L-shaped second line 1dd (W2) extending along a left edge and a lower edge of the substrate and intersecting lower end portions of the source lines 3 of all the blocks B1-B3, and source drivers 35b (drive circuits) provided in the respective blocks B1-B3 and connected to the source lines 3 of the respective blocks B1-B3.

The liquid crystal display apparatus 50d having the above configuration can be manufactured by changing the line patterns in the method of fabricating the active matrix substrate 20a of the first embodiment and mounting the source drivers 35b thereonto.

According to the liquid crystal display apparatus 50d of this embodiment and the manufacturing method therefor, as in the first to third embodiments, the liquid crystal display panel 40d is the only target to be irradiated with laser light L to repair a broken line. Therefore, a broken source line 3 can be easily repaired.

Fifth Embodiment

Figure 9:
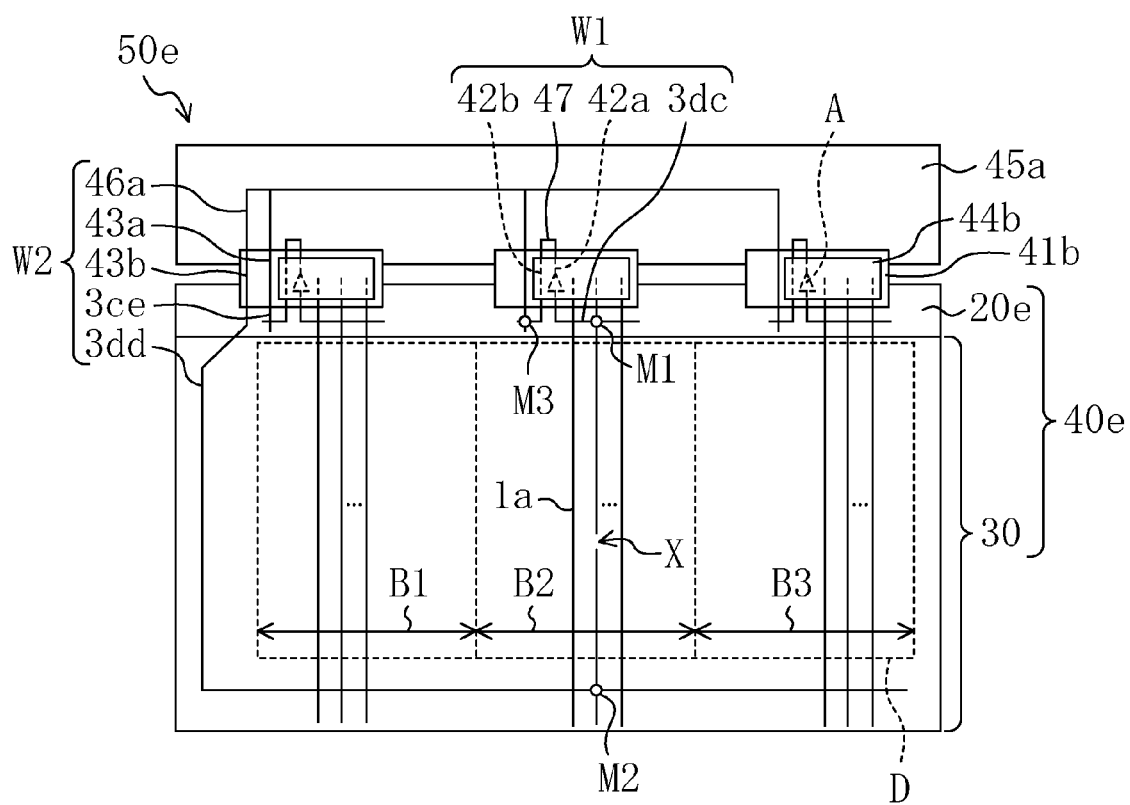
FIG. 9 is a plan view of a liquid crystal display apparatus 50e according to a fifth embodiment.

FIG. 9 is a plan view of a liquid crystal display apparatus 50e according to this embodiment.

While a source line 3 is described as an example display line in which a break is repaired in the first to fourth embodiments, a gate line 1a is described as an example display line in which a break is repaired in this embodiment.

As shown in FIG. 9, the liquid crystal display apparatus 50e includes a liquid crystal display panel 40e, three film substrates 41b attached to an upper end portion of the liquid crystal display panel 40e with ACF (not shown) being interposed therebetween, and a printed substrate 45a attached to upper ends of the film substrates 41b with ACF (not shown) being interposed therebetween.

As shown in FIG. 9, the liquid crystal display panel 40e includes an active matrix substrate 20e and a counter substrate 30 facing each other.

The active matrix substrate 20e has a display region D having substantially the same configuration as that of the active matrix substrate 20a of the first embodiment, except that the vertical and horizontal directions are switched. As shown in FIG. 9, the active matrix substrate 20e includes, outside the display region D, three on-panel first lines 3dc extending along an upper edge of the substrate and intersecting upper end portions of gate lines 1a provided in respective blocks B1-B3, three on-panel second line preceding stage portions 3ce intersecting left end portions of the respective on-panel first lines 3dc, and an L-shaped on-panel second line succeeding stage portion 3dd extending along a left edge and a bottom edge of the substrate and intersecting lower end portions of the gate lines 1a of all the blocks B1-B3. Here, the on-panel first lines 3dc, the on-panel second line preceding stage portion 3ce, and the on-panel second line succeeding stage portion 3dd are formed of the same material and in the same layer as those of the source lines 3.

The film substrates 41b are each, for example, TCP. As shown in FIG. 9, the film substrate 41b includes an on-film-substrate first line preceding stage portion 42a connected to a preceding stage portion of the corresponding on-panel first line 3dc on the active matrix substrate 20a with ACF (not shown) being interposed therebetween, an on-film-substrate first line succeeding stage portion 42b extending on the left side of and adjacent to the on-film-substrate first line preceding stage portion 42a and connected to a succeeding stage portion of the corresponding on-panel first line 3dc on the active matrix substrate 20a with ACF (not shown) being interposed therebetween, an on-film-substrate second line preceding stage portion 43a extending on the left side of and adjacent to the on-film-substrate first line succeeding stage portion 42b and connected to the corresponding on-panel second line preceding stage portion 3ce on the active matrix substrate 20a with ACF (not shown) being interposed therebetween, a gate driver 44b (drive circuit) provided on the substrate and connected to the corresponding gate lines 1a on the active matrix substrate 20a, and an amplifier circuit A incorporated in the gate driver 44b and provided on a path to the on-film-substrate first line preceding stage portion 42a.

The printed substrate 45a is, for example, PWB. As shown in FIG. 9, the printed substrate 45a includes on-printed-substrate second lines 46a each linking the on-film-substrate second line preceding stage portion 43a on the corresponding film substrate 41a and the on-film-substrate second line succeeding stage portion 43b on the leftmost film substrate 41a with ACF (not shown) being interposed therebetween, and on-printed-substrate first lines 47 each linking the on-film-substrate first line preceding stage portion 42a and the on-film-substrate first line succeeding stage portion 42b on the corresponding film substrate 41a with ACF (not shown) being interposed therebetween.

Here, as shown in FIG. 9, a first line W1 includes the on-panel first line 3*dc*, the on-film-substrate first line preceding stage portion 42*a*, the on-printed-substrate first line 47, and the on-film-substrate first line succeeding stage portion 42*b*. As shown in FIG. 9, a second line W2 includes the on-panel second line preceding stage portion 3*ce*, the on-film-substrate second line preceding stage portion 43*a*, the on-printed-substrate second line 46*a*, the on-film-substrate second line succeeding stage portion 43*b*, and the on-panel second line succeeding stage portion 3*dd*.

The liquid crystal display apparatus 50*e* having the above configuration can be manufactured by changing the line patterns in the method of fabricating the active matrix substrate 20*a* of the first embodiment.

According to the liquid crystal display apparatus 50*e* of this embodiment and the manufacturing method therefor, the first lines W1 and the second line W2 are provided outside the display region D including a plurality of blocks B1-B3 extending in parallel with each other. Also, the first lines W1 intersecting end portions closer to the gate drivers 44*b* of the gate lines 1*a* extending in parallel with each other in the blocks B1-B3 (the first lines W1 and the gate lines 1*a* are insulated from each other) intersect the second line W2 intersecting end portions farther from the gate drivers 44*b* of the gate lines 1*a* in all the blocks B1-B3 (the second line W2 and the gate lines 1*a* are insulated from each other), where the first and second lines W1 and W2 are insulated from each other. Therefore, intersections (M1, etc.) of the first lines W1 and the gate lines 1*a* in the respective blocks B1-B3, intersections (M2, etc.) of the second line W2 and the gate lines 1*a* in all the blocks B1-B3, and intersections (M3, etc.) of the first lines W1 and the second line W2 are provided outside the display region D of the liquid crystal display panel 40*e*. Therefore, a broken gate line 1*a* can be easily repaired as follows. Specifically, if any one of all the gate lines 1*a* provided on the liquid crystal display panel 40*e* is broken at a portion X, the broken line is detected in the broken-line detection step, and the broken line is repaired in the broken-line repairing step. In this case, an intersection M1 of a portion closer to the gate driver 44*b* of the broken gate line 1*a* and the corresponding first line W1, an intersection M2 of a portion farther from the source driver 44*b* of the broken gate line 1*a* and the second line W2, and an intersection M3 of the corresponding first line W1 and the second line W2, i.e., only three portions of the liquid crystal display panel 40*e*, are irradiated with laser light L to establish conduction between each line. Also, the amplifier circuit A is provided for each first line W1, i.e., for each of the blocks B1-B3. Therefore, conduction is established between each line as described above while reducing or preventing a difference between signal delays depending on the positions of the blocks B1-B3 where a break occurs. As a result, a gate signal from the gate driver 44*b* is amplified by the amplifier circuit A and then supplied to a portion farther than the break portion of the broken gate line 1*a*. Thus, when a broken line is repaired, the liquid crystal display panel 40*e* is the only target to be irradiated with the laser light L, and therefore, conditions for irradiation with the laser light L are simplified, whereby the broken gate line 1*a* can be easily repaired.

Sixth Embodiment

Figure 10:
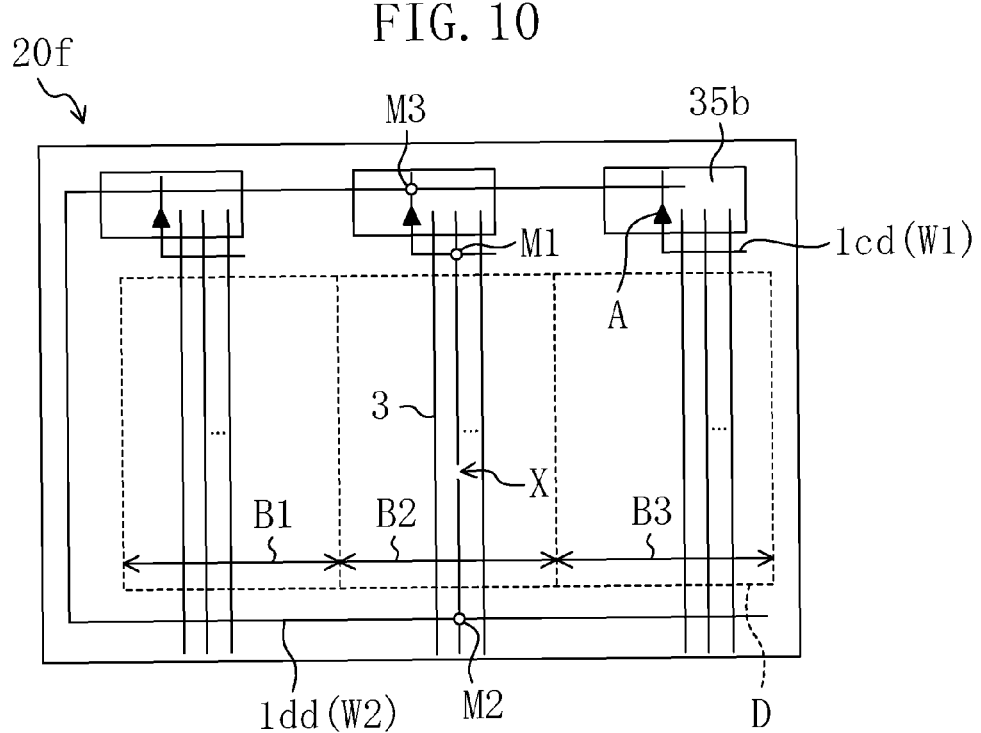
FIG. 10 is a plan view of an active matrix substrate 20f according to a sixth embodiment.
Figure 11:
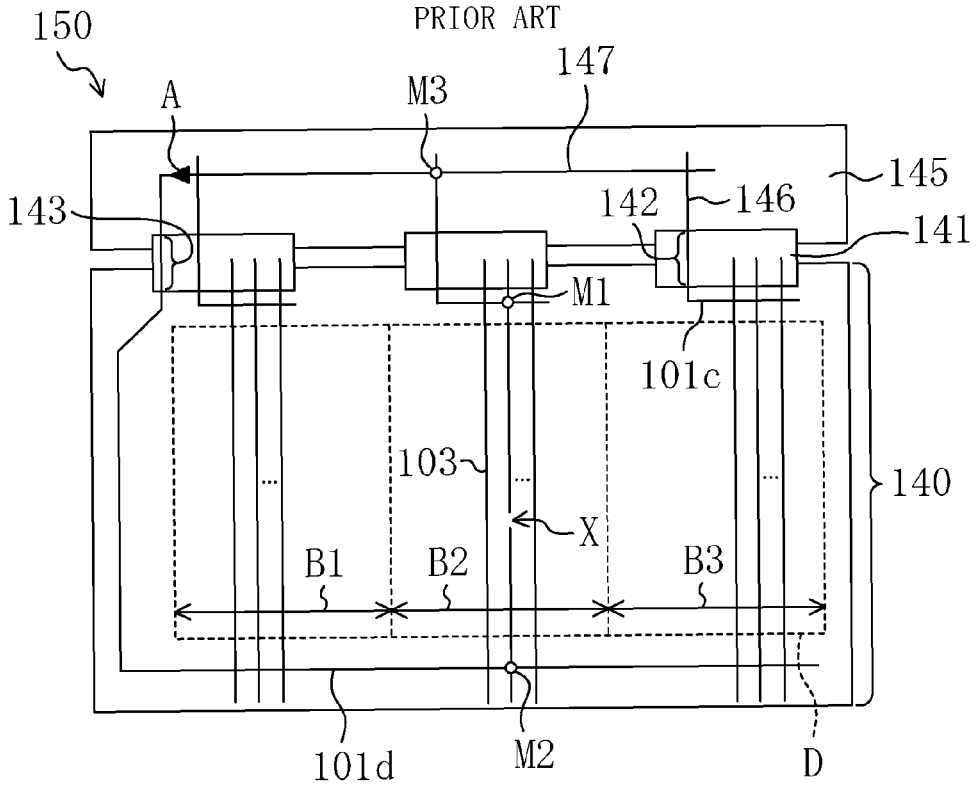
FIG. 11 is a plane view of a conventional liquid crystal display apparatus 150.

FIG. 10 is a plan view of an active matrix substrate 20*f* according to this embodiment.

While a liquid crystal display apparatus and a manufacturing method therefor in which a liquid crystal display panel is fabricated before a broken line is repaired have been described in the above embodiments, an active matrix substrate and a manufacturing method therefor in which the active matrix substrate 20*f* is fabricated before a broken line is repaired will be described in this embodiment. Here, a liquid crystal display apparatus may be constructed by interposing and enclosing a liquid crystal layer between the active matrix substrate 20*f* of this embodiment and a counter substrate. Alternatively, for example, a sensor substrate which reads charge on each pixel electrode, such as an X-ray sensor, etc., may be provided using the active matrix substrate 20*f*. Note that, in the latter case, a liquid crystal layer and a counter substrate for enclosing a liquid crystal layer are not required.

As shown in FIG. 10, the active matrix substrate 20*f* has substantially the same configuration as that of the active matrix substrate 20*d* of the fourth embodiment.

Here, a break in a display line (e.g., a source line 3) is detected in the active matrix substrate 20*f* by the follow methods: conduction is tested for each line by contacting probes to opposite end portions of the line; a portion having an abnormal pattern of the display region D is detected by image recognition, and a break portion is extracted from the detected abnormal portion; an amount of charge similar to that in actual operation is written to all pixels, and after a predetermined time has elapsed, the written charge is read out, and based on a change in the charge, it is determined whether the pixel is good or defective; etc. The broken source line 3 can be repaired by irradiating an intersection M1 of the detected broken source line 3 and a corresponding first line 1*cd*, an intersection M2 of the broken source line 3 and a second line 1*dd*, and an intersection M3 of the first line 1*cd* and the second line 1*dd* with laser light L to establish conduction between each line in the intersections M1-M3.

According to the active matrix substrate 20*f* of this embodiment and the manufacturing method therefor, the first lines 1*cd* and the second line 1*dd* are provided outside the display region D including a plurality of blocks B1-B3 extending in parallel with each other. Also, the first lines 1*cd* intersecting end portions closer to source drivers 35*b* of the source lines 3 extending in parallel with each other in the respective blocks B1-B3 (the first lines 1*cd* and the source lines 3 are insulated from each other) intersect the second line 1*dd* intersecting end portions farther from the source drivers 35*b* of the source lines 3 in all the blocks B1-B3 (the second line 1*dd* and the source lines 3 are insulated from each other), where the first and second lines 1*cd* and 1*dd* are insulated from each other. Therefore, intersections (M1, etc.) of the first lines 1*cd* and the source lines 3 in the respective blocks B1-B3, intersections (M2, etc.) of the second line 1*dd* and the source lines 3 in all the blocks B1-B3, and intersections (M3, etc.) of the first lines 1*cd* and the second line 1*dd* are provided outside the display region D of the active matrix substrate 20*f*. Therefore, a broken source line 3 can be easily repaired as follows. Specifically, if any one of all the source lines 3 provided on the active matrix substrate 20*f* is broken at a portion X, the broken line is detected in the broken-line detection step, and the broken line is repaired in the broken-line repairing step. In this case, an intersection M1 of a portion closer to the source driver 35*b* of the broken source line 3 and the corresponding first line 1*cd*, an intersection M2 of a portion farther from the source driver 35*b* of the broken source line 3 and the second line 1*dd*, and an intersection M3 of the corresponding first line 1*cd* and the second line 1*dd*, i.e., only three portions of the active matrix substrate 20*f*, are irradiated with laser light L to establish conduction between each line. Also, an amplifier circuit A is provided for each first line 1*cd*, i.e., for each of the blocks B1-B3. Therefore, conduction is established between each line as described above while reducing or preventing a difference between signal delays depending on the positions of the blocks B1-B3 where a break occurs. As a result, a source signal from the source driver 35b is amplified by the amplifier circuit A and then supplied to a portion farther than the break portion of the broken source line 3. Thus, when a broken line is repaired, the active matrix substrate 20f is the only target to be irradiated with the laser light L, and therefore, conditions for irradiation with the laser light L are simplified, whereby the broken source line 3 can be easily repaired.

Although, in the above embodiments, a liquid crystal display apparatus has been described as an example display apparatus, the present disclosure is applicable to other display apparatuses, such as an organic electroluminescent (EL) display apparatus, a field emission display (FED), etc.

Although, in the above embodiments, an example liquid crystal display apparatus and active matrix substrate in which a broken gate or source line can be repaired have been described, the present disclosure is applicable to repairing of a short circuit between a gate line and a source line. Specifically, when there is a short circuit between a gate line and a source line, a portion of the gate or source line including the short circuit is cut by, for example, irradiation with laser light so that the gate or source line has a break. Thereafter, the broken gate or source line is repaired as in the above embodiments.

Although, in the above embodiments, an example liquid crystal display apparatus and active matrix substrate in which a broken gate or source line can be repaired have been described, the liquid crystal display apparatus 50a of the first embodiment in which a broken source line 3 can be repaired may be combined with the liquid crystal display apparatus 50e of the fifth embodiment in which a broken gate line 1a can be repaired.

Although, in the above embodiments, the entire second line W2 is provided on a liquid crystal display panel (an active matrix substrate), a portion of the second line W2 may be provided on an external substrate attached to the liquid crystal display panel.

The first and second lines may have a spare capacitor for adjusting a signal waveform which can be connected thereto by irradiation with laser light.

As described above, according to the present disclosure, a broken display line can be efficiently repaired using a simple line configuration, thereby reducing the manufacturing cost of a display apparatus. The present disclosure is particularly useful for a high-definition display apparatus having a large number of lines, a display apparatus designed to have a narrow frame region around a display region, etc.

DESCRIPTION OF REFERENCE CHARACTERS

A Amplifier Circuit
B1-B3 Block
D Display Region
L Laser Light
T1 First Terminal
T2 Second Terminal
T3 Third Terminal
T4 Fourth Terminal
W1 First Line
W2 Second Line
G1, G2 Line Group
1a Gate Line (Display Line)
1c, 3dc On-Panel First Line
1cc, 1cd First Line
1d, 1dc, 3dd On-Panel Second Line Succeeding State Portion
1dd Second Line
3 Source Line (Display Line)
3c, 3cc, 3ce On-Panel Second Line Preceding Stage Portion
20a-20f Active Matrix Substrate
35a, 35b, 44a Source Driver (Drive Circuit)
40a-40e Liquid Crystal Display Panel
41a, 41b Film Substrate
42a On-Film-Substrate First Line Preceding Stage Portion
42b On-Film-Substrate First Line Succeeding Stage Portion
43a On-Film-Substrate Second Line Preceding Stage Portion
43b On-Film-Substrate First Line Succeeding Stage Portion
44b Gate Driver (Drive Circuit)
46a On-Printed-Substrate Second Line
46c On-Film-Substrate Second Line
47 On-Film-Substrate First Line
50a-50e Liquid Crystal Display Device

What is claimed is:

1. A display apparatus comprising:
a display panel having a display region including a plurality of blocks extending in parallel with each other,
wherein
the display panel includes a plurality of display lines provided in each of the blocks and extending in parallel with each other and in a direction in which the blocks extend, a plurality of drive circuits each provided outside the display region for a corresponding one of the blocks and connected to the display lines in the corresponding block, a plurality of first lines each provided outside the display region for a corresponding one of the blocks and intersecting end portions closer to the corresponding drive circuit of the display lines in the corresponding block, the first lines being insulated from the display lines, and a second line provided outside the display region and intersecting end portions farther from the drive circuits of the display lines of all the blocks, the second line being insulated from the display lines, and
the second line is configured to intersect the first lines while being insulated from the first lines, and be supplied with a display signal from each of the drive circuits via an amplifier circuit.

2. The display apparatus of claim 1, wherein
the amplifier circuit is provided in a portion of each of the first lines between an intersection of the first line and the second line and intersections of the first line and the corresponding display lines.

3. A display apparatus comprising:
a display panel having a display region including a plurality of blocks extending in parallel with each other,
wherein
the display panel includes a plurality of display lines provided in each of the blocks and extending in parallel with each other and in a direction in which the blocks extend, a plurality of drive circuits each provided outside the display region for a corresponding one of the blocks and connected to the display lines in the corresponding block, a plurality of first lines each provided outside the display region for a corresponding one of the blocks and intersecting end portions closer to the corresponding drive circuit of the display lines in the corresponding block, the first lines being insulated from the display lines, and a second line provided outside the display region and intersecting end portions farther from the drive circuits of the display lines of all the blocks, the second line being insulated from the display lines,
the second line is configured to intersect the first lines while being insulated from the first lines, and
an amplifier circuit is provided in each of the first lines.

4. The display apparatus of claim 2, wherein
a portion of each of the first lines between an intersection of the first line and the second line and intersections of the first line and the corresponding display lines makes a detour to temporarily pass through a region farther from the display region.

5. The display apparatus of claim 4, further comprising:
for each of the blocks, a plurality of first terminals connected to the respective display lines, a second terminal connected to the second line, a third terminal connected to a preceding stage portion closer to the plurality of first terminals of a detour path of the corresponding first line, and a fourth terminal connected to a succeeding stage portion closer to the second terminal of the detour path of the corresponding first line, the first to fourth terminals being provided outside the display region.

6. The display apparatus of claim 5, further comprising:
a plurality of film substrates each provided for a corresponding one of the blocks and attached to an end portion outside the display region of the display panel,
wherein
the detour paths of the first lines are provided on the respective film substrates,
the first, second, third, and fourth terminals are provided on each of the film substrates, and
the amplifier circuit is incorporated in the drive circuit provided in each of the film substrates.

7. The display apparatus of claim 6, further comprising:
a printed substrate attached to end portions farther from the display panel of the film substrates,
wherein
on the printed substrate, lines each linking the preceding stage portion and the succeeding stage portion of the detour path of the corresponding first line are provided.

8. The display apparatus of claim 2, wherein
the plurality of display lines in each of the blocks are divided into a plurality of line groups, and
the first lines are each provided for a corresponding one of the line groups.

9. The display apparatus of claim 1, wherein
each of the display lines is a source line to which a source signal is input as the display signal.

10. A method for manufacturing a display apparatus, wherein
the display apparatus includes a display panel having a display region including a plurality of blocks extending in parallel with each other,
the display panel includes a plurality of display lines provided in each of the blocks and extending in parallel with each other and in a direction in which the blocks extend, a plurality of drive circuits each provided outside the display region for a corresponding one of the blocks and connected to the display lines in the corresponding block, a plurality of first lines each provided outside the display region for a corresponding one of the blocks and intersecting end portions closer to the corresponding drive circuit of the display lines in the corresponding block, the first lines being insulated from the display lines, and a second line provided outside the display region and intersecting end portions farther from the drive circuits of the display lines of all the blocks, the second line being insulated from the display lines, and
the second line is configured to intersect the first lines while being insulated from the first lines, and be supplied with a display signal from each of the drive circuits via an amplifier circuit, and
the method comprises:
a broken-line detection step of detecting the presence of a break in the display lines; and
a broken-line repairing step of irradiating, with laser light, intersections of the display line in which a break has been detected in the broken-line detection step, and the corresponding first line and the second line, and an intersection of the corresponding first line and the second line.

11. A method for manufacturing a display apparatus, wherein
the display apparatus includes a display panel having a display region including a plurality of blocks extending in parallel with each other,
the display panel includes a plurality of display lines provided in each of the blocks and extending in parallel with each other and in a direction in which the blocks extend, a plurality of drive circuits each provided outside the display region for a corresponding one of the blocks and connected to the display lines in the corresponding block, a plurality of first lines each provided outside the display region for a corresponding one of the blocks and intersecting end portions closer to the corresponding drive circuit of the display lines in the corresponding block, the first lines being insulated from the display lines, and a second line provided outside the display region and intersecting end portions farther from the drive circuits of the display lines of all the blocks, the second line being insulated from the display lines,
the second line is configured to intersect the first lines while being insulated from the first lines, and
an amplifier circuit is provided in each of the first lines,
the method comprises:
a broken-line detection step of detecting the presence of a break in the display lines; and
a broken-line repairing step of irradiating, with laser light, intersections of the display line in which a break has been detected in the broken-line detection step, and the corresponding first line and the second line, and an intersection of the corresponding first line and the second line.

12. The method of claim 10, wherein
the amplifier circuit is provided in a portion of each of the first lines between an intersection of the first line and the second line and intersections of the first line and the corresponding display lines,
the portion of each of the first lines between the intersection of the first line and the second line and the intersections of the first line and the corresponding display lines makes a detour to temporarily pass through a region farther from the display region,
for each of the blocks, a plurality of first terminals connected to the respective display lines, a second terminal connected to the second line, a third terminal connected to a preceding stage portion closer to the plurality of first terminals of a detour path of the corresponding first line, and a fourth terminal connected to a succeeding stage portion closer to the second terminal of the detour path of the corresponding first line, the first to fourth terminals being provided outside the display region, and
the method further includes, after the broken-line repairing step, a repair confirmation step of measuring an electrical resistance between the first terminal connected to the display line which has been irradiated with laser light in the broken-line repairing step, and the third terminal connected to the preceding stage portion of the first line which has been irradiated with laser light in the broken-line repairing step, and an electrical resistance between the second terminal connected to the second line which has been irradiated with laser light in the broken-line repairing step, and the fourth terminal connected to the succeeding stage portion of the first line which has been irradiated with laser light in the broken-line repairing step.

13. An active matrix substrate having a display region including a plurality of blocks extending in parallel with each other, comprising:
   a plurality of display lines provided in each of the blocks and extending in parallel with each other and in a direction in which the blocks extend;
   a plurality of drive circuits each provided outside the display region for a corresponding one of the blocks and connected to the display lines in the corresponding block;
   a plurality of first lines each provided outside the display region for a corresponding one of the blocks and intersecting end portions closer to the corresponding drive circuit of the display lines in the corresponding block, the first lines being insulated from the display lines; and
   a second line provided outside the display region and intersecting end portions farther from the drive circuits of the display lines of all the blocks, the second line being insulated from the display lines,
   wherein
   the second line is configured to intersect the first lines while being insulated from the first lines, and be supplied with a display signal from each of the drive circuits via an amplifier circuit.

14. An active matrix substrate having a display region including a plurality of blocks extending in parallel with each other, comprising:
   a plurality of display lines provided in each of the blocks and extending in parallel with each other and in a direction in which the blocks extend;
   a plurality of drive circuits each provided outside the display region for a corresponding one of the blocks and connected to the display lines in the corresponding block;
   a plurality of first lines each provided outside the display region for a corresponding one of the blocks and intersecting end portions closer to the corresponding drive circuit of the display lines in the corresponding block, the first lines being insulated from the display lines; and
   a second line provided outside the display region and intersecting end portions farther from the drive circuits of the display lines of all the blocks, the second line being insulated from the display lines,
   wherein
   the second line is configured to intersect the first lines while being insulated from the first lines, and
   an amplifier circuit is provided in each of the first lines.

15. The display apparatus of claim 3, wherein
   a portion of each of the first lines between an intersection of the first line and the second line and intersections of the first line and the corresponding display lines makes a detour to temporarily pass through a region farther from the display region.

16. The display apparatus of claim 15, further comprising:
   for each of the blocks, a plurality of first terminals connected to the respective display lines, a second terminal connected to the second line, a third terminal connected to a preceding stage portion closer to the plurality of first terminals of a detour path of the corresponding first line, and a fourth terminal connected to a succeeding stage portion closer to the second terminal of the detour path of the corresponding first line, the first to fourth terminals being provided outside the display region.

17. The display apparatus of claim 16, further comprising:
   a plurality of film substrates each provided for a corresponding one of the blocks and attached to an end portion outside the display region of the display panel,
   wherein
   the detour paths of the first lines are provided on the respective film substrates,
   the first, second, third, and fourth terminals are provided on each of the film substrates, and
   the amplifier circuit is incorporated in the drive circuit provided in each of the film substrates.

18. The display apparatus of claim 17, further comprising:
   a printed substrate attached to end portions farther from the display panel of the film substrates,
   wherein
   on the printed substrate, lines each linking the preceding stage portion and the succeeding stage portion of the detour path of the corresponding first line are provided.

19. The display apparatus of claim 3, wherein
   the plurality of display lines in each of the blocks are divided into a plurality of line groups, and
   the first lines are each provided for a corresponding one of the line groups.

20. The display apparatus of 3, wherein
   each of the display lines is a source line to which a source signal is input as the display signal.

21. The method of claim 11, wherein
   the amplifier circuit is provided in a portion of each of the first lines between an intersection of the first line and the second line and intersections of the first line and the corresponding display lines,
   the portion of each of the first lines between the intersection of the first line and the second line and the intersections of the first line and the corresponding display lines makes a detour to temporarily pass through a region farther from the display region,
   for each of the blocks, a plurality of first terminals connected to the respective display lines, a second terminal connected to the second line, a third terminal connected to a preceding stage portion closer to the plurality of first terminals of a detour path of the corresponding first line, and a fourth terminal connected to a succeeding stage portion closer to the second terminal of the detour path of the corresponding first line, the first to fourth terminals being provided outside the display region, and
   the method further includes, after the broken-line repairing step, a repair confirmation step of measuring an electrical resistance between the first terminal connected to the display line which has been irradiated with laser light in the broken-line repairing step, and the third terminal connected to the preceding stage portion of the first line which has been irradiated with laser light in the broken-line repairing step, and an electrical resistance between the second terminal connected to the second line which has been irradiated with laser light in the broken-line repairing step, and the fourth terminal connected to the succeeding stage portion of the first line which has been irradiated with laser light in the broken-line repairing step.

* * * * *